United States Patent
Asano et al.

(10) Patent No.: US 12,354,253 B2
(45) Date of Patent: Jul. 8, 2025

(54) ALIGNMENT SYSTEM, ALIGNMENT METHOD, AND RECORDING MEDIUM

(71) Applicant: Mitsubishi Electric Corporation, Tokyo (JP)

(72) Inventors: Yuji Asano, Tokyo (JP); Weihau Lee, Tokyo (JP); Yoshihiro Sugiyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/863,659

(22) PCT Filed: Jul. 27, 2022

(86) PCT No.: PCT/JP2022/028957
§ 371 (c)(1),
(2) Date: Nov. 7, 2024

(87) PCT Pub. No.: WO2024/023975
PCT Pub. Date: Feb. 1, 2024

(65) Prior Publication Data
US 2025/0166156 A1    May 22, 2025

(51) Int. Cl.
*G06K 9/00* (2022.01)
*G05B 15/02* (2006.01)
(Continued)

(52) U.S. Cl.
CPC ............ *G06T 7/0004* (2013.01); *G05B 15/02* (2013.01); *G06T 7/70* (2017.01); *G06T 2207/30164* (2013.01)

(58) Field of Classification Search
CPC ... G06T 7/73; G06T 7/70; G06T 2207/10016; G06T 7/30
See application file for complete search history.

(56) References Cited

U.S. PATENT DOCUMENTS 8,320,613 B2 * 11/2012 Krahnstoever ......... G06T 7/292
382/103
10,909,715 B1 * 2/2021 Boggs ................ G02B 27/0093
(Continued)

FOREIGN PATENT DOCUMENTS

JP    H05-332742 A    12/1993
JP    H09-036202 A    2/1997
(Continued)

OTHER PUBLICATIONS

International Search Report and Written Opinion mailed on Sep. 27, 2022, received for PCT Application PCT/JP2022/028957, filed on Jul. 27, 2022, 9 pages including English Translation.
(Continued)

*Primary Examiner* — Hadi Akhavannik
(74) *Attorney, Agent, or Firm* — XSENSUS LLP

(57) ABSTRACT

An alignment system includes an image processor to detect an identification target included in a workpiece from a captured image of the workpiece, and an operation controller to control a driver to move the workpiece based on actual coordinates of the identification target detected by the image processor. The image processor determines within the captured image a search range partially covering the captured image and having a predetermined size based on position information generated based on an output from a position sensor in the driver, and detects the identification target from a portion of the captured image corresponding to the search range.

12 Claims, 21 Drawing Sheets

(51) Int. Cl.
    *G06T 7/00*    (2017.01)
    *G06T 7/70*    (2017.01)

(56) References Cited

U.S. PATENT DOCUMENTS

| | | | |
|---|---|---|---|
| 2001/0016293 A1 | 8/2001 | Nishi et al. | |
| 2014/0301632 A1 | 10/2014 | Ikeda et al. | |
| 2015/0077543 A1* | 3/2015 | Kerr | A61B 3/113 |
| | | | 348/135 |
| 2016/0192553 A1 | 6/2016 | Kawaguchi | |
| 2018/0289982 A1* | 10/2018 | Sayeh | G16H 30/40 |
| 2019/0139196 A1* | 5/2019 | Adler-Golden | G06T 5/50 |
| 2021/0182077 A1* | 6/2021 | Chen | G06Q 30/0241 |
| 2021/0327259 A1* | 10/2021 | Lin | A63F 13/219 |
| 2023/0044983 A1* | 2/2023 | Sayeh | A61N 5/1068 |

FOREIGN PATENT DOCUMENTS

| | | | |
|---|---|---|---|
| JP | 2002-023851 A | 1/2002 |
| JP | 2014-020336 A | 2/2014 |
| JP | 2014-203365 A | 10/2014 |
| JP | 2019-215633 A | 12/2019 |
| JP | 2020-110916 A | 7/2020 |
| JP | 2022-045522 A | 3/2022 |
| WO | 2015/019487 A1 | 2/2015 |

OTHER PUBLICATIONS

Notice of Reason for Refusal mailed on Feb. 28, 2023, received for JP Application 2022-577414, 4 pages including English Translation.
Notice of Reason for Refusal mailed on Jul. 4, 2023, received for JP Application 2022-577414, 8 pages including English Translation.
Decision to Grant mailed on Sep. 26, 2023, received for JP Application 2022-577414, 5 pages including English Translation.
International Search Report and Written Opinion mailed on Sep. 27, 2022, received for PCT Application PCT/JP2022/028956, filed on Jul. 27, 2022, 9 pages including English Translation.
Notice of Reason for Refusal mailed on Feb. 28, 2023, received for JP Application 2022-577409, 4 pages including English Translation.
Notice of Reason for Refusal mailed on Jul. 4, 2023, received for JP Application 2022-577409, 8 pages including English Translation.
Decision to Grant mailed on Sep. 26, 2023, received for JP Application 2022-577409, 5 pages including English Translation.
International Search Report and Written Opinion mailed on Sep. 27, 2022, received for PCT Application PCT/JP2022/028958, filed on Jul. 27, 2022, 9 pages including English Translation.
Decision to Grant mailed on Mar. 7, 2023, received for JP Application 2022-577416, 5 pages including English Translation.
Chinese Office Action dated Apr. 4, 2025, issued for the corresponding CN patent application No. 202280096683.8 and the English translation, 18pp.

* cited by examiner

SEARCH ANGULAR RANGE

ALIGNMENT SYSTEM, ALIGNMENT METHOD, AND RECORDING MEDIUM

CROSS-REFERENCE TO RELATED APPLICATION

This application is a national stage application, pursuant to 35 U.S.C. § 371, of International Patent Application No. PCT/JP2022/028957, filed Jul. 27, 2022, the entire contents of which are incorporated herein by reference.

TECHNICAL FIELD

The present disclosure relates to an alignment system, an alignment method, and a program.

BACKGROUND ART

In the field of factory automation (FA), alignment techniques are used to align a workpiece, or a control target, with a reference position. For example, a control system detects alignment marks on a workpiece from an image of the workpiece captured by an imaging device and aligns the marks with reference positions (for example, Patent Literature 1).

In the control system described in Patent Literature 1, the workpiece is placed on a stage including a moving mechanism, and the position of the feature on the workpiece is identified from the captured image. The control system calculates a speed based on information acquired from the moving mechanism to predict the movement amount of the workpiece and limits the search range of the captured image based on the estimated position of the feature. As described therein, this reduces the time for searching for the feature and allows faster positioning of the workpiece.

CITATION LIST

Patent Literature

Patent Literature 1: Unexamined Japanese Patent Application Publication No. 2019-215633

SUMMARY OF INVENTION

Technical Problem

The control system described in Patent Literature 1 calculates the speed based on the past driving amounts in each direction acquired from the moving mechanism, predicts the movement amount of the workpiece during the period of time between first image capturing and second image capturing, and limits the search range of the image captured in the second image capturing. However, the prediction accuracy of the search range may be degraded by the calculation for predicting the movement amounts.

The degraded prediction accuracy may cause a failure in detecting a mark. In this case, the full range of the captured image is to be searched again, increasing the overall time for alignment control. Further, to avoid such a failure in detecting a mark, the search range may be increased. This can increase the search time, and thus the processing load.

Under such circumstances, an objective of the present disclosure is to provide an alignment system, an alignment method, and a program that allow fast and precise positioning.

Solution to Problem

To achieve the above objective, an alignment system according to an aspect of the present disclosure includes an image processor to detect an identification target included in a workpiece from a captured image of the workpiece, and an operation controller to control a driver to move the workpiece based on actual coordinates of the identification target detected by the image processor. The image processor determines within the captured image a search range partially covering the captured image and having a predetermined size based on position information generated based on an output from a position sensor in the driver, and detects the identification target from a portion of the captured image corresponding to the search range.

Advantageous Effects of Invention

In the alignment system according to the above aspect of the present disclosure, the search range is determined based on the position information generated based on the output from the position sensor in the driver to allow fast and precise positioning.

DESCRIPTION OF EMBODIMENTS

Embodiment 1

Figure 1:
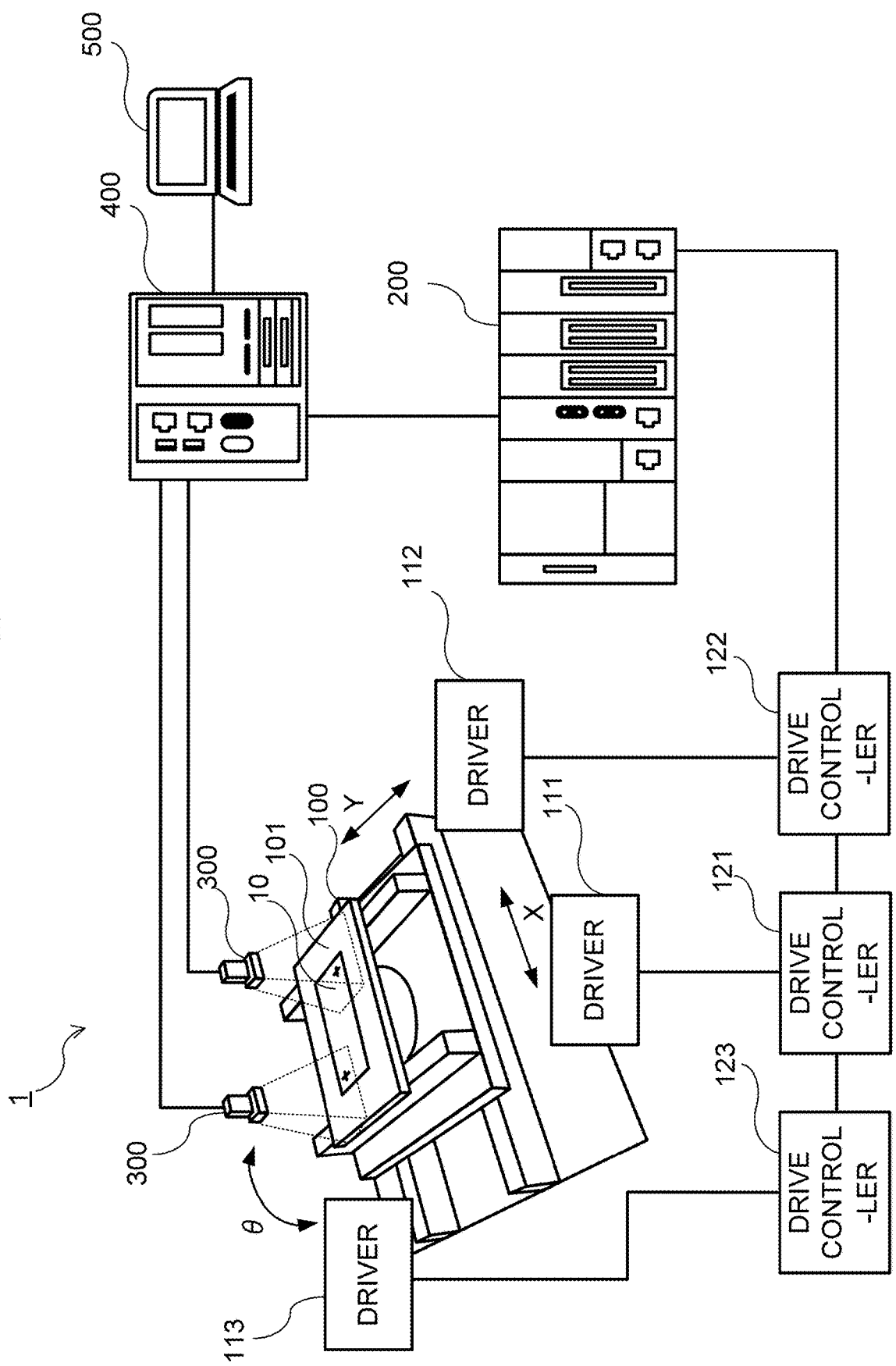
FIG. 1 is a block diagram of an alignment system according to Embodiment 1 illustrating the overall structure.

Embodiment 1 of the present disclosure is described below in detail with reference to the drawings. Like reference signs denote like or corresponding components in the drawings.

FIG. 1 is a block diagram of an alignment system 1 according to Embodiment 1 illustrating the overall structure. The alignment system 1 includes an aligner 100 that moves a workpiece 10 as a control target, an operation controller 200 that controls the aligner 100, imaging devices 300 that capture images of the workpiece 10, an image processor 400 that processes the images captured by the imaging devices 300, and a setting terminal 500 through which various settings are input for processing performed by the image processor 400.

The aligner 100 is connected to drivers 111, 112, and 113 that provide driving forces in the respective directions and move the workpiece 10. The drivers 111, 112, and 113 are connected respectively to drive controllers 121, 122, and 123. The drive controllers 121, 122, and 123 each drive the corresponding driver 111, 112, or 113 based on control signals from the operation controller 200.

The drive controllers 121, 122, and 123, the operation controller 200, the image processor 400, and the imaging devices 300 are interconnected to communicate with one another. Any known communication means, such as Ethernet (registered trademark), CameraLink, CoaxPress (registered trademark), or universal serial bus (USB, registered trademark), can be used. Ethernet-based industrial networks such as CC-Link IE Field (registered trademark) or CC-Link IE Time Sensitive Networking (CC-Link IE TSN, registered trademark) may be used to achieve synchronization.

The aligner 100 includes a mount table 101 on which the workpiece 10 is placeable and a mechanism to move the mount table 101. For example, the mount table can be translated in an X-direction and a Y-direction perpendicular to each other in the horizontal direction, and can be rotated in a θ-direction that is a rotation direction on a horizontal plane. In the present embodiment, among the drivers connected to the aligner 100, the driver 111 causes translation in the X-direction, the driver 112 causes translation in the Y-direction, and the driver 113 causes rotation in the θ-direction.

The drivers 111, 112, and 113 are any actuators that can precisely drive the aligner 100. The drivers 111, 112, and 113 are, for example, servomotors. The drive controllers 121, 122, and 123 control driving of the respective drivers 111, 112, and 113 based on control signals from the operation controller 200. The drive controllers 121, 122, and 123 are, for example, servo amplifiers.

The drivers 111, 112, and 113 each include an internal or external position sensor to detect and output the positions that have actually changed by driving of the drivers 111, 112, and 113. The position sensor is, for example, an encoder attached to the corresponding actuator. The output signals from the encoders are input into the operation controller 200 through the drive controllers 121, 122, and 123. In the present embodiment described below, the drivers 111, 112, and 113 are servomotors, the drive controllers 121, 122, and 123 are servo amplifiers, and the position sensors are encoders.

The operation controller 200 is a motion controller that provides commands about the operations of the drivers 111, 112, and 113 to the drive controllers 121, 122, and 123. The operation controller 200 includes, for example, a programmable logic controller (PLC). The operation controller 200 generates control signals indicating the commands based on information acquired from the drive controllers 121, 122, and 123 and the image processor 400, and outputs the control signals to the drive controllers 121, 122, and 123.

Figure 2:
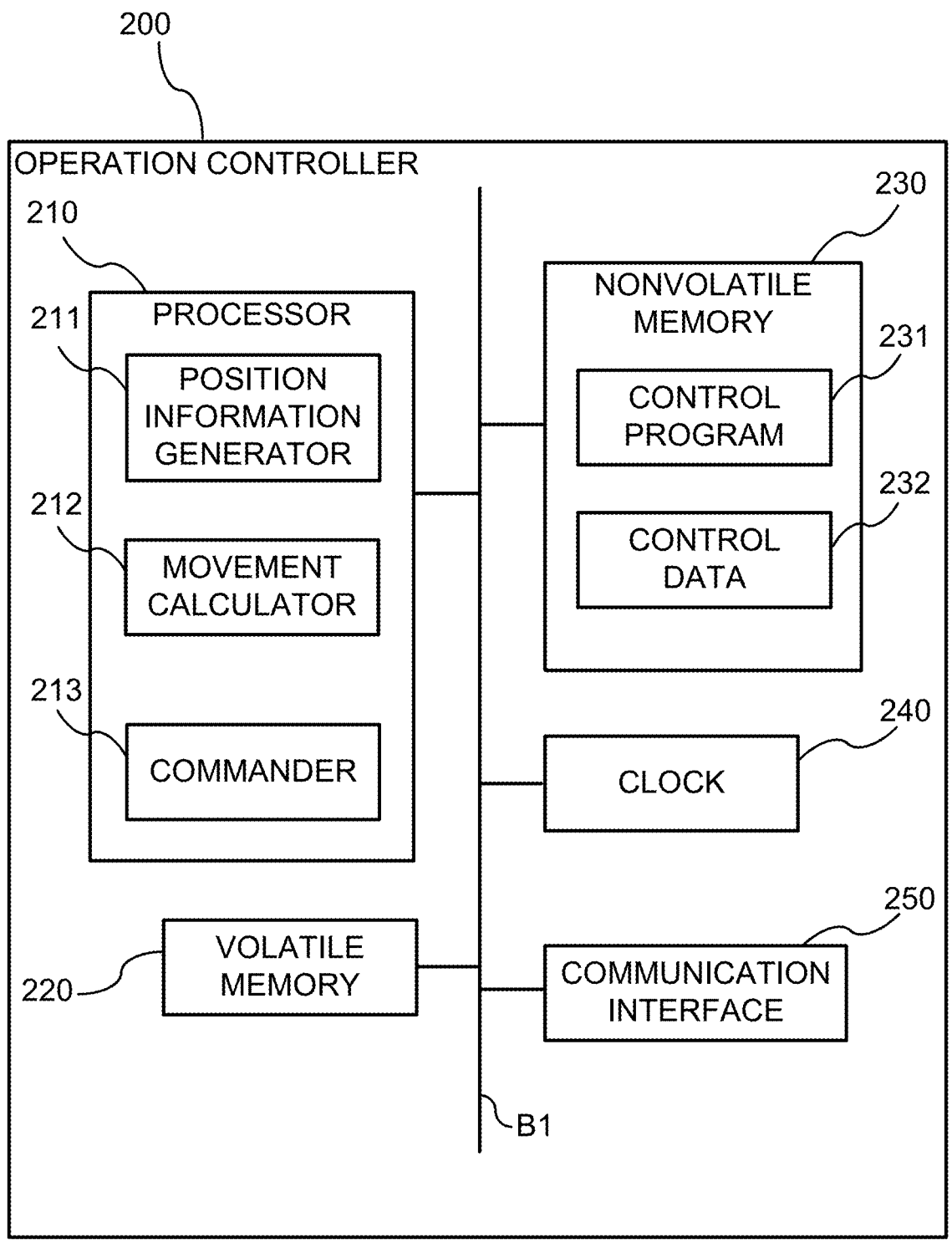
FIG. 2 is a block diagram of an operation controller in an example.

The operation controller 200 includes, as illustrated in FIG. 2, a processor 210, a volatile memory 220, a nonvolatile memory 230, a clock 240, and a communication interface 250. The processor 210, the volatile memory 220, the nonvolatile memory 230, the clock 240, and the communication interface 250 are interconnected with a bus B1 to communicate with one another.

The processor 210 is, for example, a central processing unit (CPU) that reads and executes a control program 231 stored in the nonvolatile memory 230 to function as a position information generator 211, a movement calculator 212, and a commander 213.

The position information generator 211 in the processor 210 generates, based on the output signals from the position sensors in the drivers 111, 112, and 113, position information corresponding to the position of the mount table 101 on which the workpiece 10 is placed. The movement calculator 212 calculates the amount of movement of the workpiece 10 in the X-direction, the Y-direction, and the θ-direction based on the position of an identification target detected by the image processor 400 from captured images. The commander 213 outputs control signals based on the movement amount calculated by the movement calculator 212 to the drive controllers 121, 122, and 123.

The volatile memory 220 is a work memory that can read and write data at high speed during arithmetic operations performed by the processor 210. The volatile memory 220 is, for example, a random-access memory (RAM). The nonvolatile memory 230 stores the control program 231 for implementing the various functions of the operation controller 200 and control data 232 including parameters used when the control program 231 is executed, past detection data, and command data. Examples of the nonvolatile memory 230 include a nonvolatile semiconductor memory such as an electrically erasable programmable read-only memory (EEPROM) or a flash memory, a magnetic disk, and an optical disk.

The clock 240 measures local time by counting a clock signal from a clock element in the operation controller 200. The clock 240 performs synchronization with the drive controllers 121, 122, and 123, the imaging devices 300, and the image processor 400. This allows the operation controller 200 to have time information synchronized with the drive controllers 121, 122, and 123, the imaging devices 300, and the image processor 400.

The communication interface 250 is an interface for the operation controller 200 to communicate with the drive controllers 121, 122, and 123, the imaging devices 300, and the image processor 400. The communication interface 250 is compliant with communication standards such as CC-Link IE Field and CC-Link IE TSN.

The imaging devices 300 capture images of the workpiece 10 from above the aligner 100 at predetermined intervals. The imaging devices 300 are, for example, cameras with sufficient resolution to achieve alignment precision of the alignment system 1. Although any number of imaging devices 300 may be used, the number of imaging devices 300 is determined as appropriate for the number of identification targets used for alignment and the positions of the identification targets. In FIG. 1, two imaging devices 300 are used. The identification target may be any target that indicates the position of the workpiece 10. The identification target is, for example, an alignment mark on the workpiece 10, a corner of the workpiece 10, or a corner of the mount table 101.

Each imaging device 300 also has time information synchronized with the drive controllers 121, 122, and 123, the operation controller 200, and the image processor 400 and a communication interface for communicating with the drive controllers 121, 122, and 123, the operation controller 200, and the image processor 400.

The image processor 400 detects the identification target from captured images acquired from the imaging devices 300 by a rough search and a fine search that are different search methods. The rough search is performed on the full range of the captured images acquired from the imaging devices 300, whereas the fine search is performed on a search range narrower than the range for the rough search. When the identification target is detected by the fine search, the image processor 400 outputs the actual coordinates of the identification target to the operation controller 200. The actual coordinates are coordinates in a reference coordinate system aligned with the movement calculator 212 in the operation controller 200.

Figure 3:
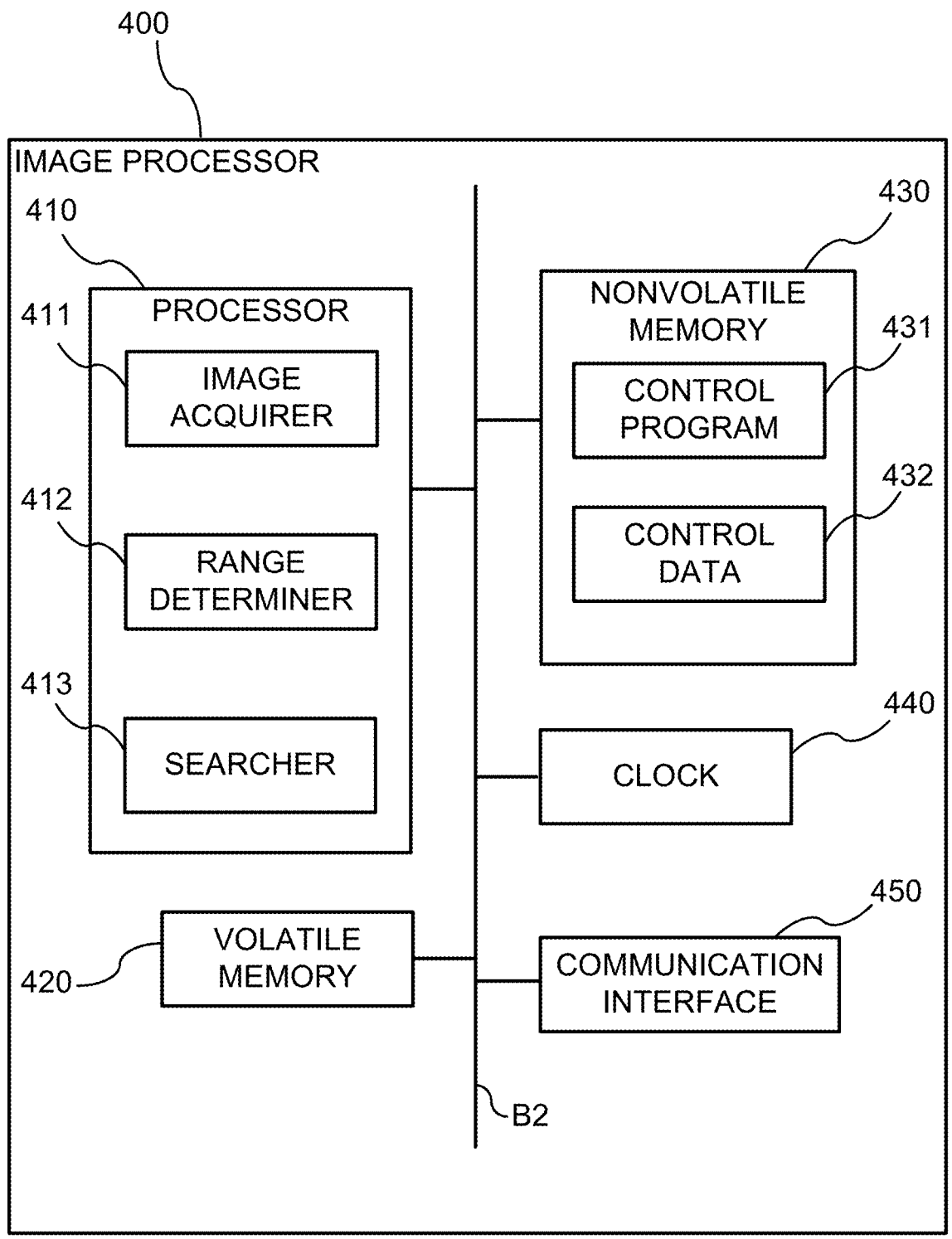
FIG. 3 is a block diagram of an image processor in an example.

The image processor 400 includes, as illustrated in FIG. 3, a processor 410, a volatile memory 420, a nonvolatile memory 430, a clock 440, and a communication interface 450. The processor 410, the volatile memory 420, the nonvolatile memory 430, the clock 440, and the communication interface 450 are interconnected with a bus B2 to communicate with one another.

The processor 410 is, for example, a CPU that reads and executes a control program 431 stored in the nonvolatile memory 430 to function as an image acquirer 411, a range determiner 412, and a searcher 413.

The image acquirer 411 in the processor 410 acquires images captured by the imaging devices 300. The range determiner 412 determines a range for searching for an identification target from each captured image acquired by the image acquirer 411 based on information including position information generated by the position information generator 211 in the operation controller 200. The searcher 413 performs a fine search for the identification target on a portion of the image within the search range determined by the range determiner 412, and outputs the actual coordinates of the identification target to the operation controller 200 when the identification target is detected.

The volatile memory 420 is a work memory that can read and write data at high speed during arithmetic operations performed by the processor 410. The volatile memory 420 is, for example, a RAM. The nonvolatile memory 430 stores the control program 431 for implementing the various functions of the image processor 400 and control data 432 including parameters used when the control program 431 is executed and past detection data. Examples of the nonvolatile memory 430 include a nonvolatile semiconductor memory such as an EEPROM or a flash memory, a magnetic disk, and an optical disk.

The clock 440 measures local time by counting a clock signal from a clock element in the image processor 400. The clock 440 performs synchronization with the drive controllers 121, 122, and 123, the operation controller 200, and the imaging devices 300. This allows the image processor 400 to have time information synchronized with the drive controllers 121, 122, and 123, the operation controller 200, and the imaging devices 300.

The communication interface 450 is an interface for the image processor 400 to communicate with the drive controllers 121, 122, and 123, the operation controller 200, and the imaging devices 300. The communication interface 450 is compliant with communication standards such as CC-Link IE Field and CC-Link IE TSN.

The setting terminal 500 is, for example, a personal computer in which an application program corresponding to the control program 431 in the image processor 400 is installed. The setting terminal 500 manages the image processor 400, including managing inputs or changes of parameters stored in the nonvolatile memory 430 in the image processor 400. The communication interface for the setting terminal 500 to be connected to communicate with the image processor 400 is any interface corresponding to the interface included in the image processor 400. The communication interface is, for example, a USB interface or Recommended Standard-232C (RS232C) interface.

The operation controller 200 calculates the movement amount based on the difference between the actual coordinates of the identification target detected by the image processor 400 and target coordinates for alignment, and outputs control signals based on the movement amount to the drive controllers 121, 122, and 123.

Figure 4:
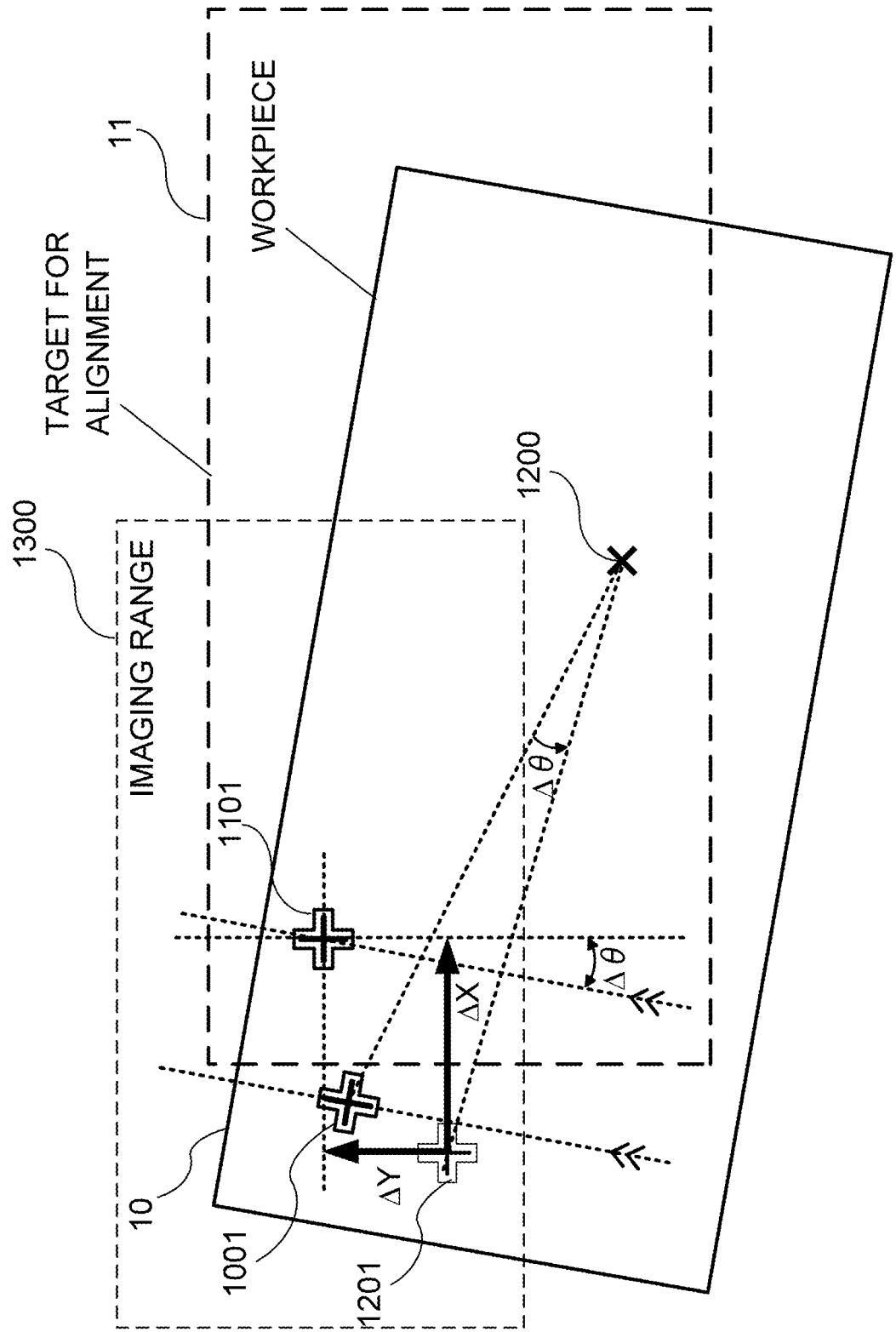
FIG. 4 is a diagram illustrating an alignment control method.
Figure 5:
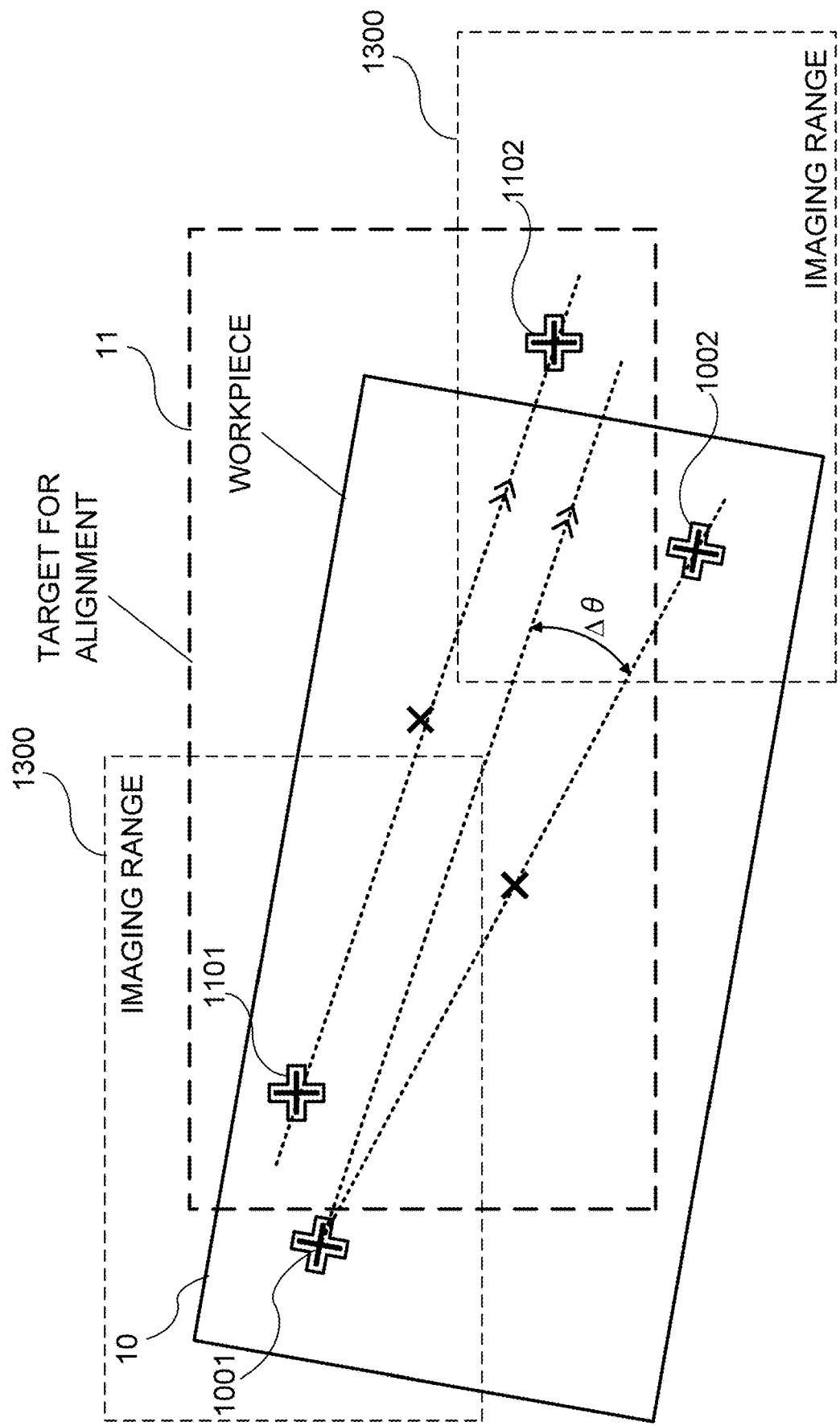
FIG. 5 is a diagram illustrating an alignment control method.

An operation of the alignment system 1 with the above structure is described. An example typical alignment method based on the position of the identification target is described with reference to FIGS. 4 and 5. FIGS. 4 and 5 are diagrams illustrating an alignment method performed with identification targets that are alignment marks 1001 and 1002 attached at ends of the workpiece 10.

Although the alignment marks 1001 and 1002 may have any shape, the alignment marks 1001 and 1002 may be, for example, cross marks as illustrated in FIGS. 4 and 5 to allow clear identification of the position of a reference point and the rotation angle. Any number of alignment marks may be attached. A single alignment mark may be attached as illustrated in FIG. 4, or the two alignment marks 1001 and 1002 may be attached on diagonal ends of the workpiece 10 as illustrated in FIG. 5.

When one alignment mark 1001 is used, one imaging device 300 is used to acquire an image of an imaging range 1300. When the two alignment marks 1001 and 1002 are used, with one imaging range 1300 not covering the two alignment marks 1001 and 1002 for image capturing, two imaging devices 300 are used to acquire images of the imaging ranges 1300 that are offset from each other.

When one alignment mark 1001 is used as illustrated in FIG. 4, three items of information are used, including the coordinates of a reference point of an alignment target mark 1101, the coordinates of a reference point of the alignment mark 1001 on the workpiece 10, and the angular difference between the alignment target mark 1101 and the alignment mark 1001.

When the two alignment marks 1001 and 1002 are used as illustrated in FIG. 5, three items of information are used, including the midpoint coordinates of the reference points of alignment target marks 1101 and 1102, the midpoint coordinates of the reference points of the alignment marks 1001 and 1002 on the workpiece 10, and the angular difference between a straight line connecting the alignment target marks 1101 and 1102 and a straight line connecting the alignment marks 1001 and 1002.

In both FIGS. 4 and 5, an angular difference $\Delta\theta$ is the movement amount of the $\theta$ axis. Thus, as illustrated in FIG. 4, the operation controller 200 determines the imaginary coordinates of a reference point of an imaginary mark 1201 after rotating the workpiece 10 by the angle $\Delta\theta$ about a rotation center 1200 of the $\theta$-axis of the aligner 100. The movement amount $\Delta X$ in the X-direction and the movement amount $\Delta Y$ in the Y-direction are then calculated based on the difference between the imaginary coordinates and the target coordinates of the alignment target mark 1101. The commander 213 in the operation controller 200 transmits control signals, or provides commands, for achieving such movement by the amounts $\Delta\theta$, $\Delta X$, and $\Delta Y$ determined in the above manner to the drive controllers 121, 122, and 123.

The method using one alignment mark 1001 as illustrated in FIG. 4 can be used when the rotation of the alignment mark 1001, such as a cross mark, can be clearly identified. When using the two alignment marks 1001 and 1002 as illustrated in FIG. 5, rotation of the alignment marks is not to be detected. This allows use of, for example, circular alignment marks to detect rotation of the workpiece. Additionally, the angular difference $\Delta\theta$ in the $\theta$-direction is calculated based on detected two points that are sufficiently apart from each other. This allows precise control.

In this manner, the operation controller 200 calculates the amounts $\Delta\theta$, $\Delta X$, and $\Delta Y$ based on the coordinates and the angular difference of the reference points of the alignment marks 1001 and 1002 that are the identification targets. The operation controller 200 uses the calculated values to cause the drive controllers 121, 122, and 123 to control the drivers 111, 112, and 113, thus moving the workpiece 10. However, the difference from the target coordinates is typically not within an allowable range after a single control operation. Detecting the identification targets and controlling the drivers 111, 112, and 113 are thus performed repeatedly.

In such processing that is performed repeatedly, the processing load for searching for the identification targets from the images captured by the imaging devices 300 is notably high. The alignment system 1 according to the present embodiment reduces the processing load by limiting the range of search.

Figure 6:
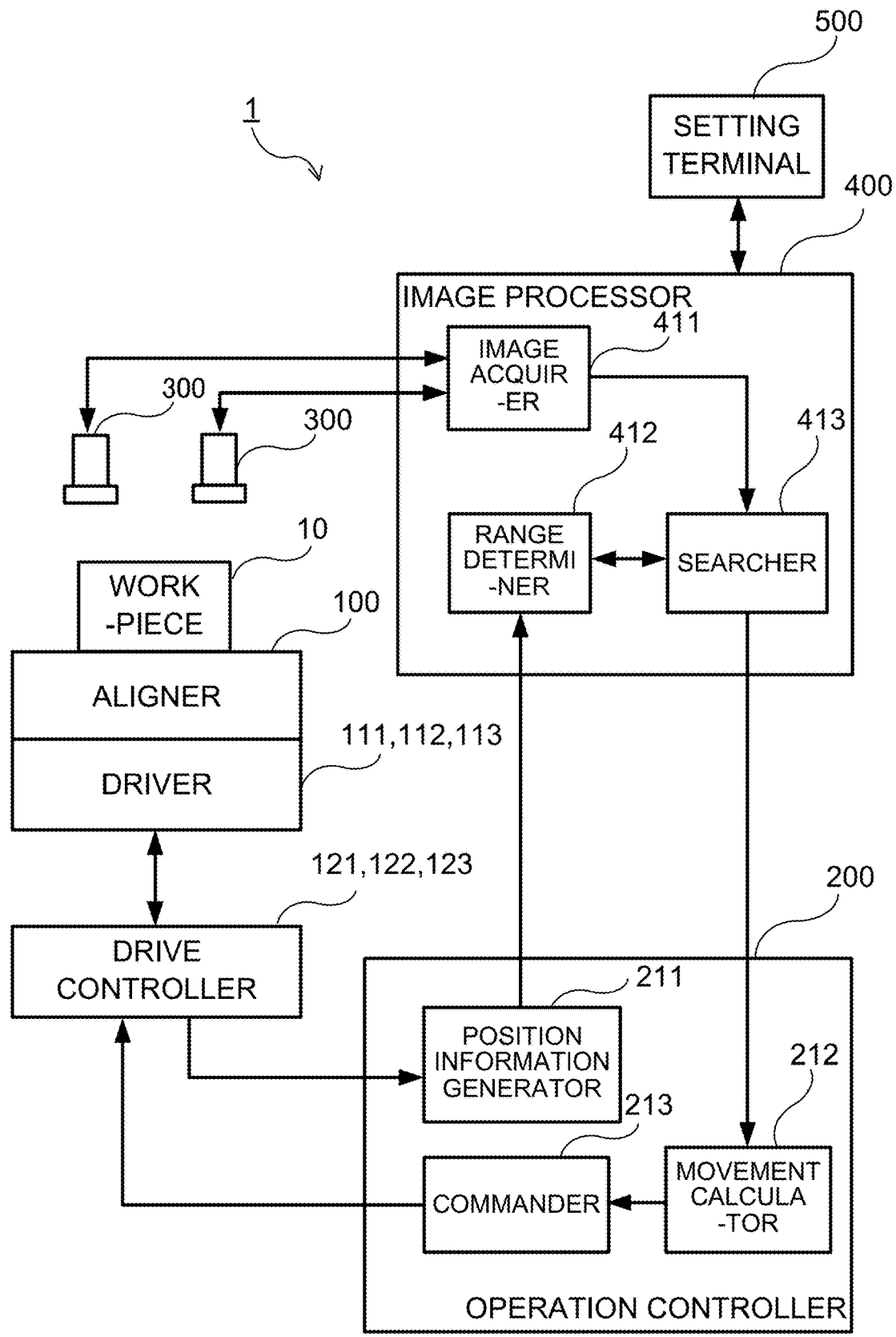
FIG. 6 is a functional block diagram of the alignment system according to Embodiment 1.
Figure 7:
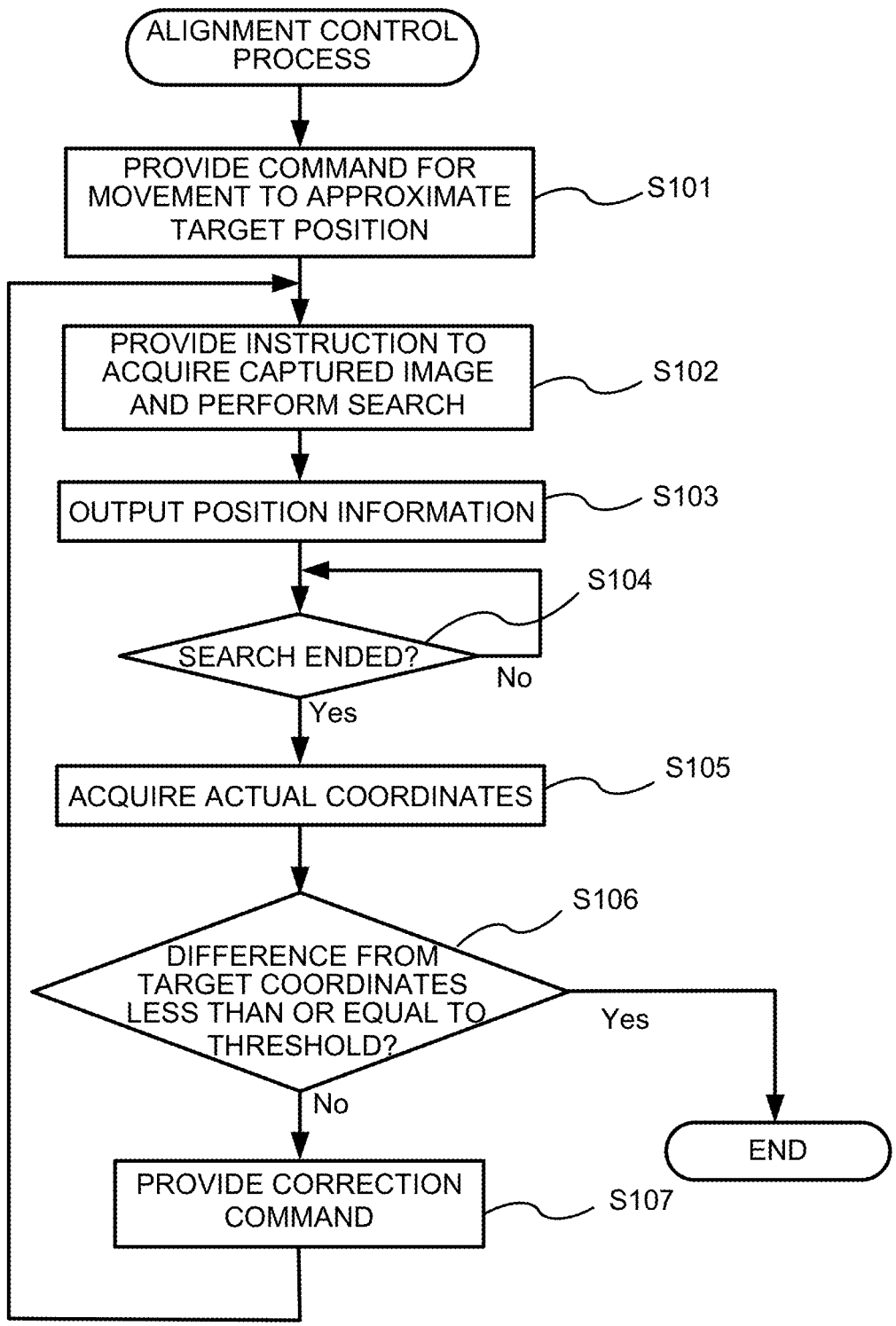
FIG. 7 is a flowchart of an alignment control process in Embodiment 1.
Figure 8:
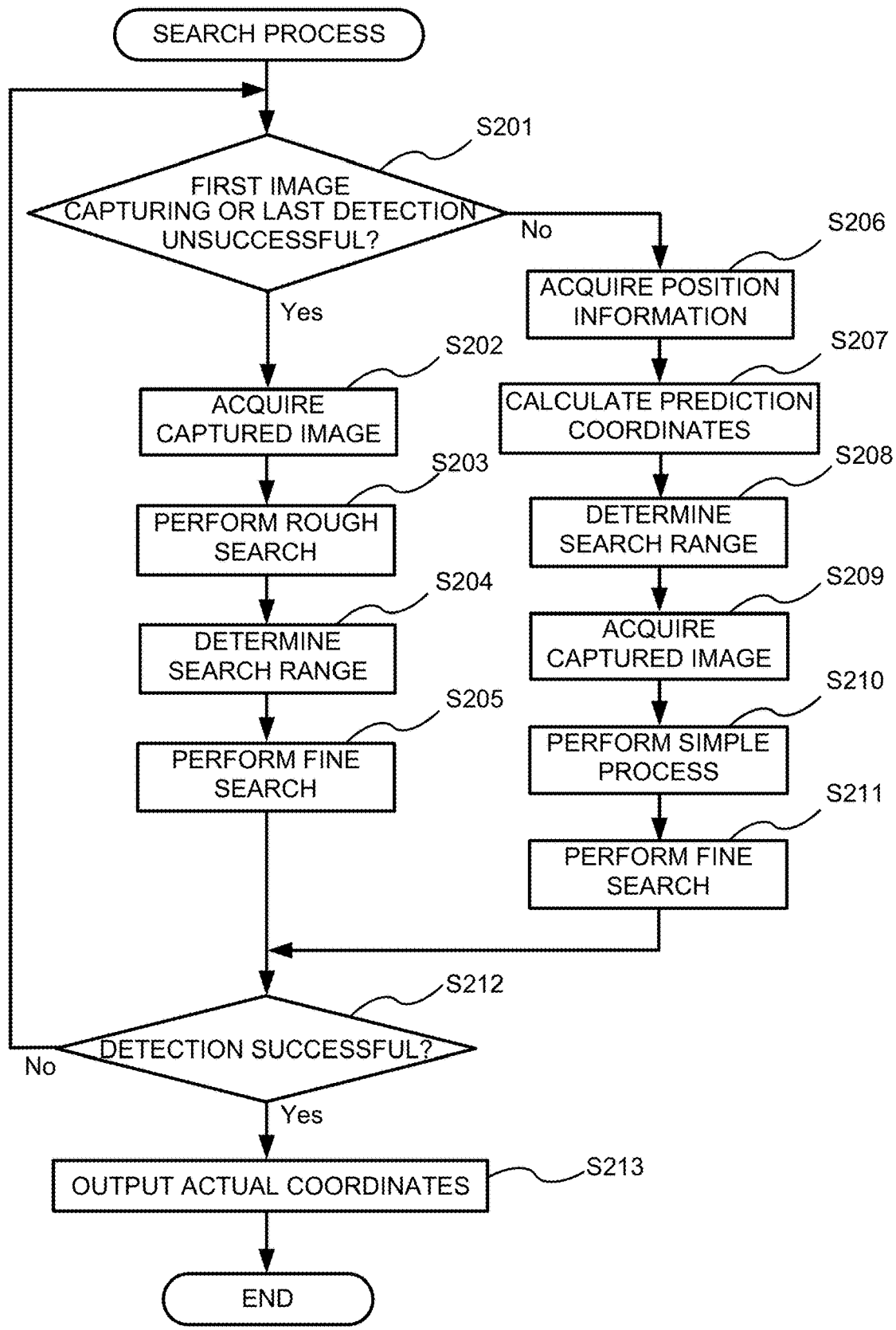
FIG. 8 is a flowchart of a search process in Embodiment 1.

The process is described below in detail with reference to FIGS. 6 to 8. FIG. 6 is a functional block diagram of the alignment system 1 according to the present embodiment. FIG. 7 is a flowchart of an alignment control process performed by the operation controller 200. FIG. 8 is a flowchart of a search process performed by the image processor 400.

The operation controller 200 first provides a command to move the workpiece 10 to a preset approximate target position (step S101 in FIG. 7). More specifically, the operation controller 200 outputs control signals to the drive controllers 121, 122, and 123 to implement movement in the respective directions. The drivers 111, 112, and 113 are then driven by the drive controllers 121, 122, and 123 based on the control signals to move the mount table 101 on which the workpiece 10 is placed.

After the movement, the operation controller 200 instructs the image processor 400 to acquire captured images and perform a search (step S102), and generates and outputs position information based on the outputs from the position sensors in the drivers 111, 112, and 113 (step S103). The operation controller 200 then waits until the image processor 400 ends the search (step S104).

The image processor 400 instructed by the operation controller 200 to perform the search process for the identification targets in step S102 performs the process illustrated in FIG. 8. In this state, image capturing is performed for the first time (Yes in step S201), and thus the image acquirer 411 in the image processor 400 acquires images captured by the imaging devices 300 (step S202). The searcher 413 then performs a rough search for the identification targets (step S203).

The rough search is performed by, for example, pattern matching using a pre-registered pattern model of the alignment mark 1001. The searcher 413 detects the alignment mark 1001 when the pattern matching rate is greater than or equal to a predetermined threshold, and determines a search range for a fine search based on the position of the reference point of the alignment mark 1001 or the rotation angle of the alignment mark 1001 (step S204). The shape or the size of the search range in the step is preset as appropriate for the shape or the size of the alignment mark 1001, and may be set by a user input into the setting terminal 500.

Figure 9A:
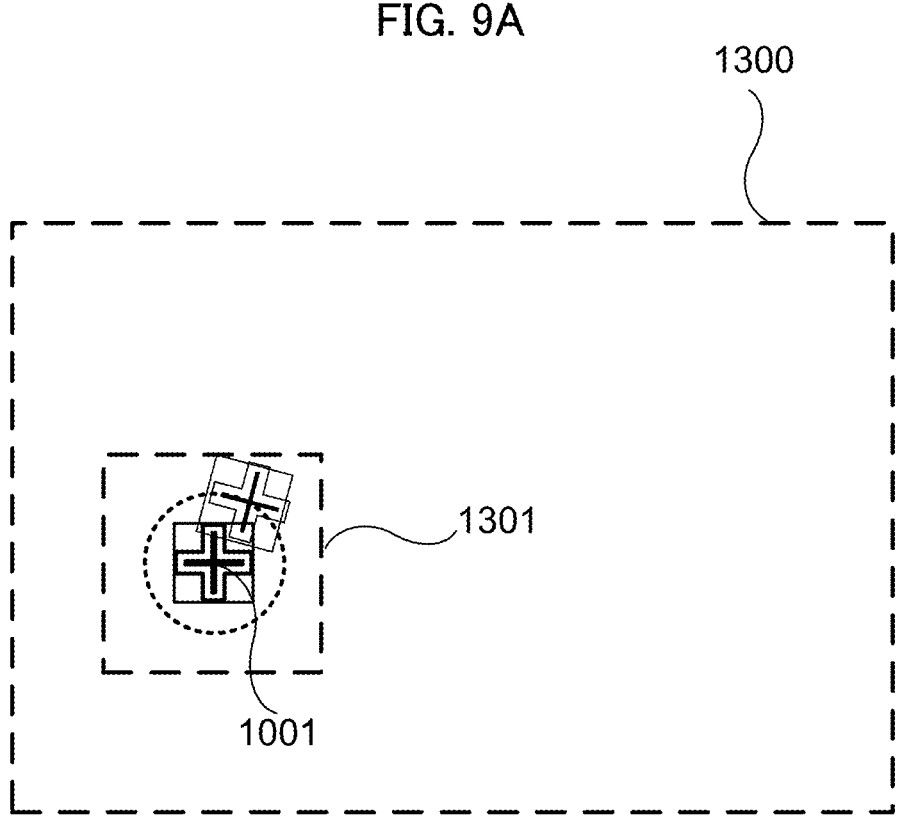
FIG. 9A is a diagram of an example search range.
Figure 9B:
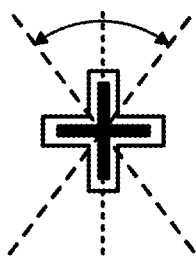
FIG. 9B is a diagram of an example search angular range.

For example, for the cross alignment mark 1001 illustrated in FIG. 9A, the searcher 413 identifies, by pattern matching, the center position as a reference point and the rotation angle of the cross, and determines a search range 1301 having a size acquired by adding a predetermined margin to the size of the alignment mark 1001. A search range based on the angle (a search angular range) illustrated in FIG. 9B is also determined.

The searcher 413 performs a fine search on the portion of the image within the search range determined in step S204 (step S205). The fine search includes, for example, edge detection to accurately detect straight lines or curves to acquire more accurate actual coordinates of the identification target. The actual coordinates of the identification target include the position of the reference point (XY coordinates) and the rotation angle ($\theta$ coordinate) of the identification target.

When the searcher 413 detects no identification target in the fine search in step S205 (No in step S212), the process returns to step S201 and repeats steps S202 to S205. When successfully detecting the identification target in the fine search in step S205 (Yes in step S212), the searcher 413 outputs the actual coordinates of the identification target acquired in step S205 to the operation controller 200 (step S213).

Referring back to the flowchart in FIG. 7, after the search process with the image processor 400 ends (Yes in step S104), the operation controller 200 acquires the actual coordinates from the image processor 400 (step S105) and calculates the difference from the target coordinates. When the difference between the actual coordinates and the target coordinates is less than or equal to the threshold (Yes in step S106), the alignment control process is ended. The target coordinates in this example are coordinates of the alignment target and include a center position (XY coordinates) and a rotation angle ($\theta$ coordinate).

When the difference between the actual coordinates and the target coordinates is greater than the threshold (No in step S106), the commander 213 provides a command to correct the position of the aligner 100 (step S107, or providing a command). More specifically, the commander 213 outputs control signals for matching the actual coordinates to the target coordinates to the drive controllers 121, 122, and 123.

After the drivers 111, 112, and 113 are driven, the process returns to step S102. The operation controller 200 again provides an instruction to perform image capturing and the search (step S102) and outputs position information (step S103).

Referring again to the flowchart in FIG. 8, with image capturing being for the second time or a subsequent time and the last-time detection being successful (No in step S201), the image processor 400 acquires position information (step S206). The range determiner 412 in the image processor 400 calculates prediction coordinates of the identification target at the time point (step S207).

More specifically, the range determiner 412 identifies a correspondence between the position information acquired from the operation controller 200 in the first alignment control and the actual coordinates detected in the first fine search. For example, the relationship between the XY coordinates of the position information in the first control and the XY coordinates of the actual coordinates is represented by a constant matrix A in Formula 1 below, where $(x_1, y_1)$ is the XY coordinates of the position information in the first control, and $(X_1, Y_1)$ is the XY coordinates of the actual coordinates.

$$A = (X_1, Y_1)/(x_1, y_1) \quad (1)$$

The XY coordinates $(X_2, Y_2)$ of the prediction coordinates to be used in the second search can be represented by Formula 2 below using the constant matrix A represented by Formula 1, where $(x_2, y_2)$ is the XY coordinates indicated by the position information acquired from the operation controller 200 in the second alignment control. The n-th time, including the third or subsequent times, can be similarly represented by Formula 3.

$$(X_2, Y_2) = A(x_2, y_2) \quad (2)$$

$$(X_n, Y_n) = A(x_n, y_n) \quad (3)$$

The constant matrix A representing the correspondence between the position information and the actual coordinates may be updated each time or may be an average of multiple times based on the position information and the actual coordinates acquired in the alignment control performed repeatedly. In another example, the correspondence between the position information and the actual coordinates may be pre-constructed through pre-calibration. For example, pre-calibration is effective for alignment control using a corner of the mount table 101 as an identification target, with a smaller error per process.

As described above, the correspondence between the XY coordinates of the reference point of the identification target detected from captured images and the position information is pre-identified, and the XY coordinates are predicted from the newly acquired position information using this correspondence (step S207). Subsequently, a search range having a predetermined size is determined using the predicted XY coordinates as a center (step S208). Similarly, for the θ coordinate, the correspondence between the actual coordinate detected in the fine search and the position information is pre-identified, and the θ coordinate indicating the rotation angle of the identification target is predicted based on the newly acquired position information (step S207). A search angular range having a predetermined angular width is then determined using the predicted θ coordinate as a center (step S208). The search range may be other than the range centered at the predicted coordinates, and may be a range including the predicted coordinates as appropriate for the alignment conditions or the shape of the identification target.

The size of the search range may be set by a user input into the setting terminal 500 or may be set automatically. For example, the size of the search range may be acquired by adding, to the shape or the size of the identification target, a margin determined automatically or manually based on the movement speed of the drivers 111, 112, and 113. In another example, the size of the search range may be statistically determined based on past alignment control results. For example, the size may be acquired by adding, as a margin, the average of differences between the prediction coordinates calculated based on the position information and the actual coordinates detected from the captured image at past time points corresponding to each other to the shape or the size of the identification target.

In other words, when image capturing is for the second time or a subsequent time and the last-time detection is not unsuccessful, the range determiner 412 determines the search range centered at the prediction coordinates calculated based on the position information based on the outputs from the position sensors in step S207 without performing the rough search in step S203. This determination of the search range based on the position information uses a notably lower processing load than the determination of the search range by the rough search performed in step S203. This allows faster control than known alignment control that performs a rough search each time.

The image acquirer 411 then acquires an image (step S209, or acquiring a captured image) and performs a simple process on the portion of the acquired image corresponding to the search range determined in step S208 (step S210). The simple process is any pre-processing before the fine search. For example, the searcher 413 may perform a rough search on a range wider than the search range determined in step S208 but narrower than the full range, and re-determine the search range. In another example, the simple process may be a rough search for the θ coordinate for determining a search angular range when the prediction coordinates of the XY coordinates have been calculated in step S207 and the search range based on the XY coordinates has been determined in step S208. The simple process may be eliminated.

The searcher 413 then performs a fine search on the search range determined in step S208 or the range determined in step S210 (step S211, or searching the captured image). The method for the fine search is the same as in step S205. When no identification target is detected in the fine search in step S211 (No in step S212), the process returns to step S201 and performs steps S202 to 205, with the last-time detection being unsuccessful (Yes in step S201). Starting over with a rough search on the full range can avoid loss of control resulting from repeated failure detections in the fine search.

When the identification target is successfully detected in the fine search in step S211 (Yes in step S212), the actual coordinates of the identification target acquired in step S211 are output to the operation controller 200.

Referring back again to the flowchart in FIG. 7, the operation controller 200 acquires the actual coordinates from the image processor 400 (step S105) and calculates the difference from the target coordinates. When the difference between the actual coordinates and the target coordinates is less than or equal to the threshold (Yes in step S106), the operation controller 200 ends the alignment process.

When the difference between the actual coordinates and the target coordinates is greater than the threshold (No in step S106), the commander 213 provides a command to correct the position of the aligner 100 (step S107). More specifically, the commander 213 outputs control signals for matching the actual coordinates to the target coordinates to the drive controllers 121, 122, and 123. The process then returns to step S102 and continues.

As described above, the alignment system 1 according to the present embodiment includes the image processor 400 and the operation controller. The image processor 400 detects an identification target from an image of the workpiece 10 including the identification target. The operation controller controls the drivers 111, 112, and 113 that move the workpiece 10 based on the actual coordinates of the identification target detected by the image processor 400. The image processor 400 pre-identifies the correspondence between the position information based on the outputs from the position sensors in the drivers 111, 112, and 113 and the actual coordinates of the identification target detected from the captured image, calculates, using this correspondence, the prediction coordinates of the identification target from the position information acquired next, determines a search range including this prediction coordinates, and detects the identification target from the portion of the image corresponding to the search range. This eliminates a rough search on the full range and allows fast and precise positioning.

Embodiment 2

Embodiment 2 of the present disclosure is described below in detail with reference to the drawings. Like reference signs denote like or corresponding components in the drawings.

The overall structure of an alignment system 2 according to Embodiment 2 and the hardware configuration of each component are the same as in Embodiment 1. The alignment system 2 according to Embodiment 2 differs from the system in Embodiment 1 in that the image acquirer 411 in the image processor 400 generates a transfer instruction specifying a transfer range to acquire captured images from the imaging devices 300 and in that the searcher 413 performs the search process on the portion of each captured image within the transfer range.

In the present embodiment, as in Embodiment 1, the drive controllers 121, 122, and 123, the operation controller 200, the image processor 400, and the imaging devices 300 are interconnected to communicate with one another. However, the structure in the present embodiment uses higher responsiveness than the structure in Embodiment 1, and may use an industrial network such as CC-Link IE Field or CC-Link IE TSN for a communication connection.

To maintain synchronization in the industrial networks such as CC-Link IE Field and CC-Link IE TSN, hardware (H/W) devices include a mechanism that achieves a particular level of punctuality and synchronizes the timing between the devices in microseconds by statistically measuring delays on transmission paths.

Figure 10:
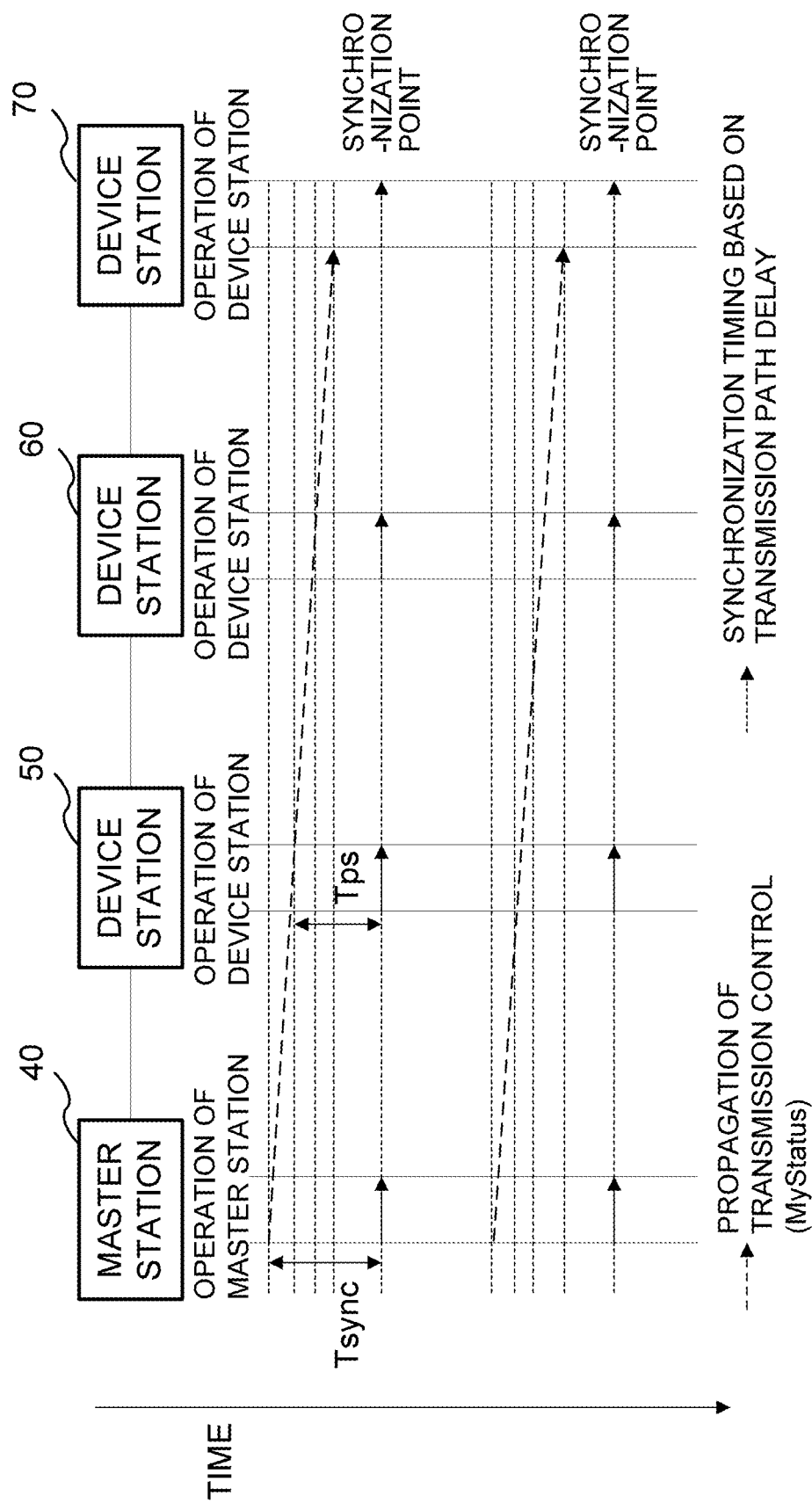
FIG. 10 is a diagram illustrating synchronization based on transmission path delay measurement.

Synchronization schemes based on transmission path delay measurement use measurement values indicating transmission path delays from a master station to a device station to improve the accuracy of synchronization. FIG. 10 illustrates a synchronization scheme based on transmission path delay measurement. In the transmission path delay measurement-based scheme, synchronization is performed at synchronization points. A transmission control (MyStatus) frame transmitted from a master station 40 propagates with a delay over distance.

The master station 40 calculates the transmission delay durations at device stations 50, 60, and 70 based on the master station times at which the master station 40 receives response signals from the device stations 50, 60, and 70, and transmits the delay durations to the device stations 50, 60, and 70. Each synchronization point is the time at which a predetermined period (Tsync) has elapsed after the master station 40 transmits the transmission control (MyStatus) frame. Each of the device stations 50, 60, and 70 performs synchronization at the elapse of time Tps, calculated by subtracting the transmission path delay duration (Tsync—delay duration), after the time at which the device has received a transmission control (MyStatus) frame.

In the present embodiment, this transmission path delay measurement scheme is used to perform the timing control of the drive controllers 121, 122, and 123, the operation controller 200, the imaging devices 300, and the image processor 400, using the operation controller 200 as the master station 40, for example. In other words, the drive controllers 121, 122, and 123, the operation controller 200, the imaging devices 300, and the image processor 400 are interconnected to communicate with one another with an industrial network (communication line) for which the transmission path delay durations are measured, and have synchronized time information.

The operation controller 200 as the master station 40 sets, as the synchronization point, a specific time after the elapse of the longest transmission path delay duration from the time at which the instruction is transmitted. The image processor 400 then determines a range including the prediction coordinates at the specific time in the future as a transfer range, and instructs each imaging device 300 to capture an image at the specific time and transfer the portion of the image within the transfer range.

Figure 11:
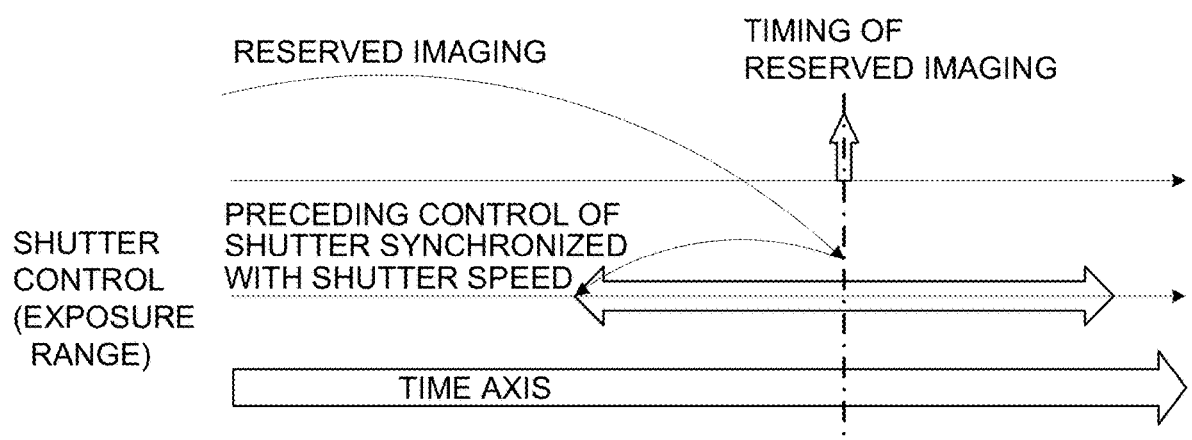
FIG. 11 is a diagram illustrating timing control for a shutter in an imaging device.

The timing control for each imaging device 300 may be performed reflecting the shutter speed. FIG. 11 is a diagram illustrating the timing control for the shutter in the imaging device 300. Using the synchronized time information used to calculate the synchronization point, the imaging device 300 automatically determines the imaging timing based on setting information acquired from the image processor 400 or predetermined setting information. To achieve image capturing at the specific time in the future, the image processor 400 may provide, as appropriate, a preceding imaging instruction within a grace period, or the timing of reserved imaging may be aligned with the center of the exposure time range.

Figure 12:
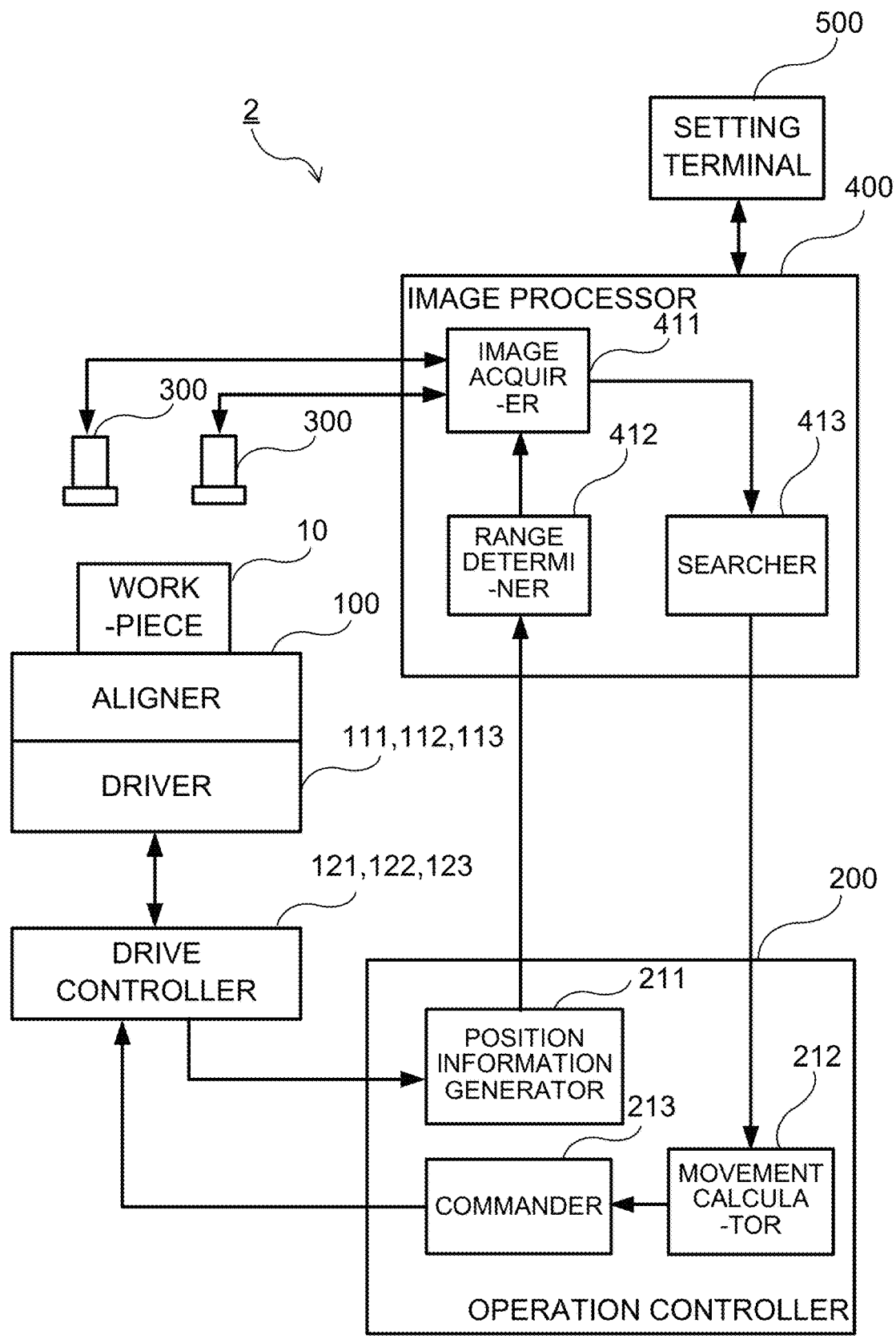
FIG. 12 is a functional block diagram of an alignment system according to Embodiment 2.
Figure 13:
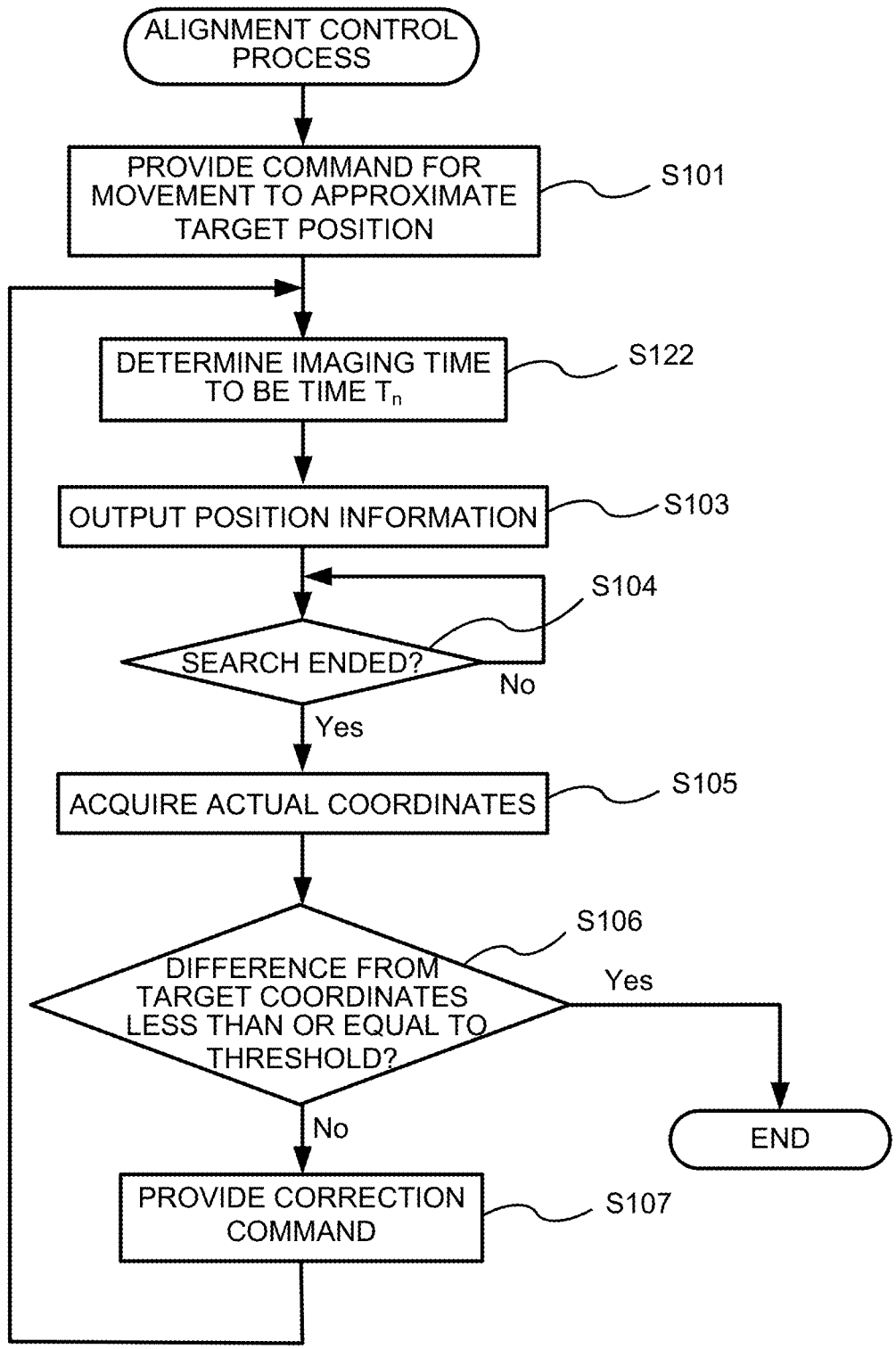
FIG. 13 is a flowchart of an alignment control process in Embodiment 2.
Figure 14:
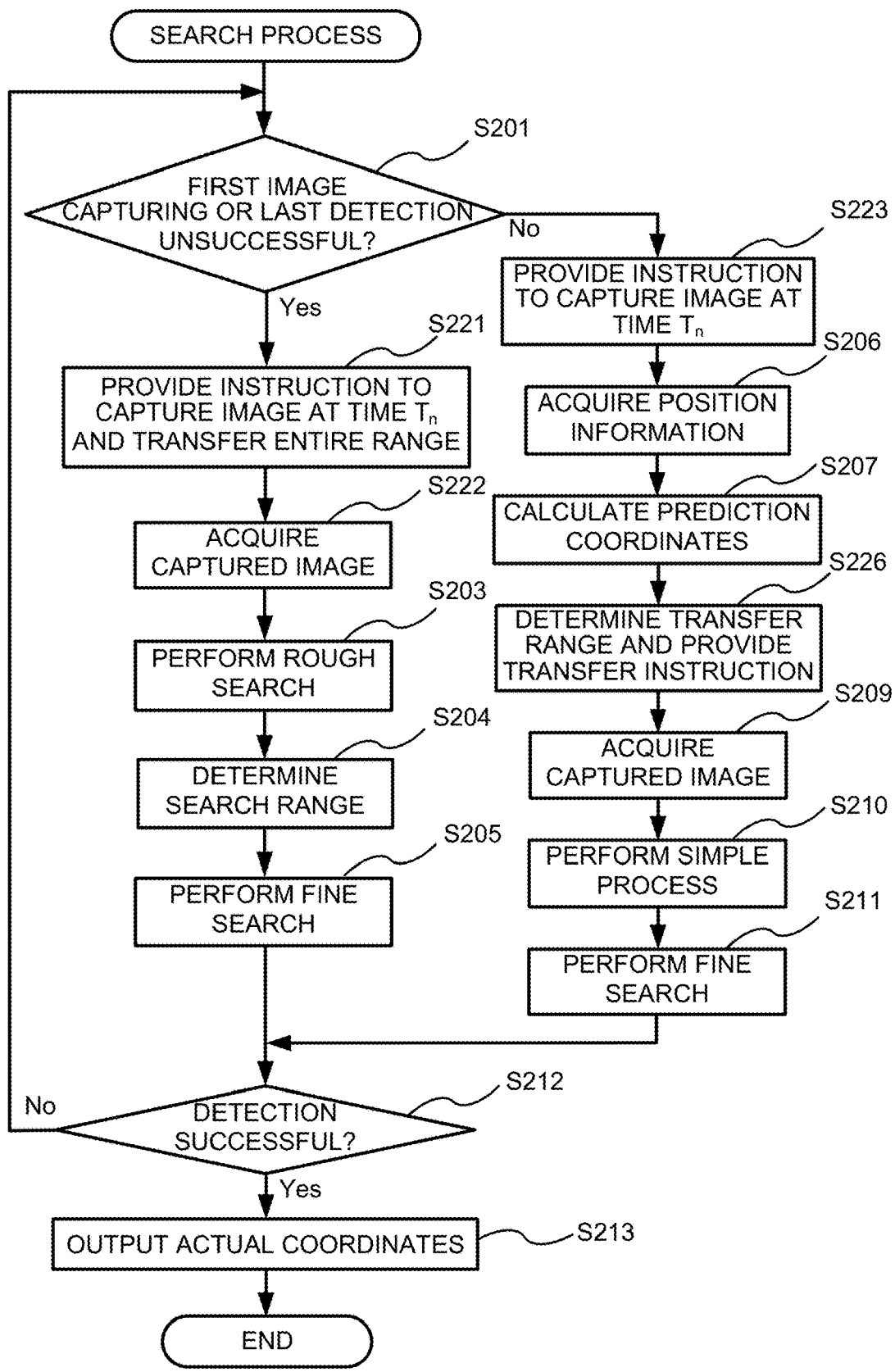
FIG. 14 is a flowchart of a search process in Embodiment 2.

FIG. 12 is a functional block diagram of the alignment system 2 according to the present embodiment. FIG. 13 is a flowchart of an alignment control process performed by the operation controller 200. FIG. 14 is a flowchart of a search process performed by the image processor 400. The operation of the alignment system 2 is described with reference to the flowcharts in FIGS. 13 and 14.

The operation controller 200 first provides a command to move the workpiece 10 to a preset approximate target position (step S101 in FIG. 13). More specifically, the operation controller 200 outputs control signals to the drive controllers 121, 122, and 123 to implement movement in the respective directions. The drivers 111, 112, and 113 are then driven by the drive controllers 121, 122, and 123 based on the control signals to move the mount table 101 on which the workpiece 10 is placed.

After providing the movement command, the operation controller 200 determines the imaging time in the imaging devices 300 to be time $T_n$ (n=1) (step S122) and specifies the time for the image processor 400. The position information generator 211 in the operation controller 200 generates position information based on the outputs from the position sensors in the drivers 111, 112, and 113 and outputs the position information (step S103). The operation controller 200 then waits until the image processor 400 ends the search (step S104).

After acquiring the position information from the operation controller 200, the image processor 400 performs the process illustrated in FIG. 14. In this state, image capturing is performed for the first time (Yes in step S201), and thus the image acquirer 411 in the image processor 400 instructs each imaging device 300 to capture an images at time $T_n(n=1)$ and transfer the full range of the captured image (step S221). The image acquirer 411 then acquires the full range of the captured image (step S222).

The searcher 413 in the image processor 400 performs a rough search for the identification target on the full range of the captured image (step S203). The rough search is performed by, for example, pattern matching using a pre-registered pattern model of the alignment mark 1001. The searcher 413 detects the alignment mark 1001 as the identification target when the pattern matching rate is greater than or equal to a predetermined threshold, and determines a search range for a fine search based on the position of the reference point of the alignment mark 1001 or the rotation angle of the alignment mark 1001 (step S204). The shape or the size of the search range in this example is predetermined based on the shape or the size of the alignment mark 1001, and may be set by a user input into the setting terminal 500.

A fine search is then performed on the portion of the image within the search range determined in step S204 (step S205). The fine search includes, for example, edge detection to detect exact straight lines or curves to acquire more accurate actual coordinates of the identification target. The actual coordinates of the identification target include the position of the reference point (XY coordinates) and the rotation angle (θ coordinate) of the identification target.

When no identification target is detected in the fine search in step S205 (No in step S212), the process returns to step S201 and repeats steps S221, S222, and S203 to S205. When the identification target is successfully detected in the fine search in step S205 (Yes in step S212), the actual coordinates of the identification target acquired in step S205 are output to the operation controller 200 (step S213).

Referring back to the flowchart in FIG. 13, after the search process with the image processor 400 ends (Yes in step S104), the operation controller 200 acquires the actual coordinates from the image processor 400 (step S105) and calculates the difference from the target coordinates. When the difference between the actual coordinates and the target coordinates is less than or equal to the threshold (Yes in step S106), the alignment control process is ended. The target coordinates in this example are coordinates of the alignment target and include a center position (XY coordinates) and a rotation angle (θ coordinate).

When the difference between the actual coordinates and the target coordinates is greater than the threshold (No in step S106), the commander 213 provides a command to correct the position of the aligner 100 (step S107, or providing a command). More specifically, the commander 213 outputs control signals for matching the actual coordinates to the target coordinates to the drive controllers 121, 122, and 123.

After providing the correction command to the aligner 100, the operation controller 200 returns to step S122, determines the imaging time to be time $T_n$ (n=2) (step S122), outputs the position information (step S103), and waits until the image processor 400 ends the search process (step S104).

Referring back again to the flowchart in FIG. 14, with the next image capturing being for the second time or a subsequent time and the last-time detection being successful (No in step S201), the image processor 400 instructs each imaging device 300 to capture an image at time $T_n(n=2)$ (step S223). The image processor 400 acquires the position information from the operation controller 200 (step S206). The range determiner 412 in the image processor 400 predicts the coordinates of the identification target at the time point (step S207).

The method for predicting the coordinates includes, as in Embodiment 1, identifying the correspondence between the position information acquired from the operation controller 200 in the first alignment control and the actual coordinates detected in the first fine search. The range determiner 412 uses the identified correspondence to predict the XY coordinates of the reference point of the identification target based on the position information acquired in step S206 (step S207). The range determiner 412 then determines a transfer range having a predetermined size centered at the XY coordinates predicted in step S207, and instructs each imaging device 300 to transfer a captured image for which a transfer range is specified (Step S226). The transfer range may be other than the range centered at the predicted XY coordinates, and may be a range including the predicted XY coordinates as appropriate for the alignment conditions or the shape of the identification target.

The size of the transfer range may be set by a user input into the setting terminal 500. For example, robustness and processing speed are in a trade-off relationship, and thus a smaller transfer range may be set when prioritizing throughput by maximizing an average processing speed while allowing processing to fluctuate. In contrast, when jitter characteristics are to be prioritized over the processing speed to achieve a constant processing time, a large transfer range may be set.

In another example, the size of the transfer range may be acquired by adding, to the shape or the size of the identification target, a margin that is set automatically or manually based on the movement speeds of the drivers 111, 112, and 113. In another example, the range determiner 412 may statistically determine the size of the transfer range based on past alignment control results. For example, the range determiner 412 may determine the size of the transfer range by adding, as a margin, the average difference between the prediction coordinates calculated based on past position information and the actual coordinates of the identification target detected from the image to the size of the identification target.

Thus, when the image capturing is for the second time or a subsequent time and the last-time detection is not unsuccessful as in this case, each imaging device 300 transfers, without transferring the full range of the image, the portion of the image within the transfer range centered at the prediction coordinates based on the position information from the position sensors as determined in step S226. The data volume of the image transferred in this step is notably smaller than the data volume of the image of the full range transferred in step S221. The data transfer volume and the transfer time can be shortened compared with when the full range of the image is transferred each time, thus allowing fast control without a rough search performed on the full range.

The image acquirer 411 acquires the portion of the image within the transfer range transferred as indicated by the transfer instruction in step S226 (step S209, or acquiring an image). The searcher 413 performs a simple process on the portion of the image within the transfer range (step S210). The simple process is any pre-processing before the fine search. For example, a rough search may be performed on the portion of the image within the transfer range acquired in step S209 to determine the search range. In particular, the simple process may be a rough search for the θ coordinate for determining a search angular range. The simple process may be eliminated.

A fine search is then performed on the portion of the image within the transfer range acquired in step S209 or on the search range determined in step S210 (step S211, or searching the captured image). The method for the fine search is the same as in step S205. When no identification target is detected in the fine search in step S211 (No in step S212), the process returns to step S201 and performs steps S221, S222, and S203 to 205, with the last-time detection being unsuccessful (Yes in step S201). Starting over with a rough search on the full range of the image can avoid loss of control resulting from repeated failure detections in the fine search.

When the identification target is successfully detected in the fine search in step S211 (Yes in step S212), the actual coordinates of the identification target acquired in step S211 are output to the operation controller 200 (step S213).

Referring back again to the flowchart in FIG. 13, the operation controller 200 acquires the actual coordinates from the image processor 400 (step S105) and calculates the difference from the target coordinates. When the difference between the actual coordinates and the target coordinates is less than or equal to the threshold (Yes in step S106), the operation controller 200 ends the alignment process.

When the difference between the actual coordinates and the target coordinates is greater than the threshold (No in step S106), the commander 213 provides a command to correct the position of the aligner 100 (step S107). More specifically, the commander 213 outputs control signals for matching the actual coordinates to the target coordinates to the drive controllers 121, 122, and 123. The process then returns to step S122 and continues.

As described above, the range determiner 412 in the image processor 400 determines the transfer range of the image based on the position information, and the searcher 413 performs a fine search on the image transferred from each imaging device 300. This notably reduces transfer time and search time.

The image processor 400 may specify the transfer range for the imaging devices 300 before outputting an imaging trigger to the imaging devices 300, instead of specifying imaging parameters including the transfer range together with an imaging instruction.

When the transfer range is specified together with the imaging instruction, the synchronization scheme based on transmission path delay measurement described above is used to synchronize the timing of image capturing by the imaging devices 300 and the acquisition of the position information, thus reducing the waiting time and allowing a search within an appropriate transfer range. When the transfer range is pre-specified, the imaging trigger alone is output through a dedicated line, allowing precise synchronization of timing of image capturing.

The full range of the image specified in step S221 and the portion of the image within the transfer range specified in step S226 in FIG. 14 may have the size reduced by each imaging device 300 before being transferred. A method for such image reduction may be any known method, such as subsampling or binning. In particular, binning has a relatively low processing load and can improve the signal-to-noise ratio (S/N ratio) of pixel signals, and thus can avoid lowering the position recognition accuracy when the resolution is decreased by image size reduction.

In limiting (trimming) the transfer range as specified by the transfer instruction in step S226, image size reduction may be performed together with the transfer range limitation when the actual coordinates and the target coordinates are far apart at an early stage of alignment control. After the actual coordinates and the target coordinates are closer enough to be within a predetermined distance range, the reduction may not be performed. When reducing the size of the image of the full range or within the transfer range, a model trained for reduced data may be prepared as a pattern model for a search, and the searcher 413 may perform a rough search or a fine search using this model.

In parallel with the fine search (step S211) after the portion of the captured image within the transfer range is acquired as specified by the transfer instruction in step S226, the full range of the captured image may also be acquired. This can save time for acquiring the full range of the captured image when no identification target is detected in the fine search in step S211 (No in step S212). In this case, upon detection of the identification target in the fine search, the transfer of the full range of the captured image may be stopped, or the transferred images may be deleted.

As described above, in the alignment system 2 according to the present embodiment, the image processor 400 pre-identifies the correspondence between the position information held by the drivers 111, 112, and 113 and the actual coordinates of the identification target detected from the captured image. The image processor 400 calculates, using this correspondence, the prediction coordinates of the identification target based on the position information acquired next, determines a transfer range of the image including this prediction coordinates, and detects the identification target by a fine search on the portion of the image within the transfer range transferred from each imaging device 300. This reduces transfer time and the volume of the image to be transferred and also eliminates a rough search on the full range of the image, thus allowing fast and precise alignment control.

Modifications

The above embodiments may be modified in various manners. Modifications are described below.

Modification 1

In Embodiments 1 and 2, the range determiner 412 in the image processor 400 determines, as the search range or the transfer range, the range including the prediction coordinates calculated based on the position information based on the outputs from the position sensors in the drivers 111, 112, and 113. However, the search range or the transfer range may be determined in other manners. In Modification 1, other methods for determining a search range or a transfer range are described.

In the present modification, command information about driving of drivers 111, 112, and 113 is used to calculate prediction coordinates for determining a search range or a transfer range. More specifically, the range determiner 412 in the image processor calculates the prediction coordinates based on the command information and determines a search range or a transfer range including the prediction coordinates.

Figure 15:
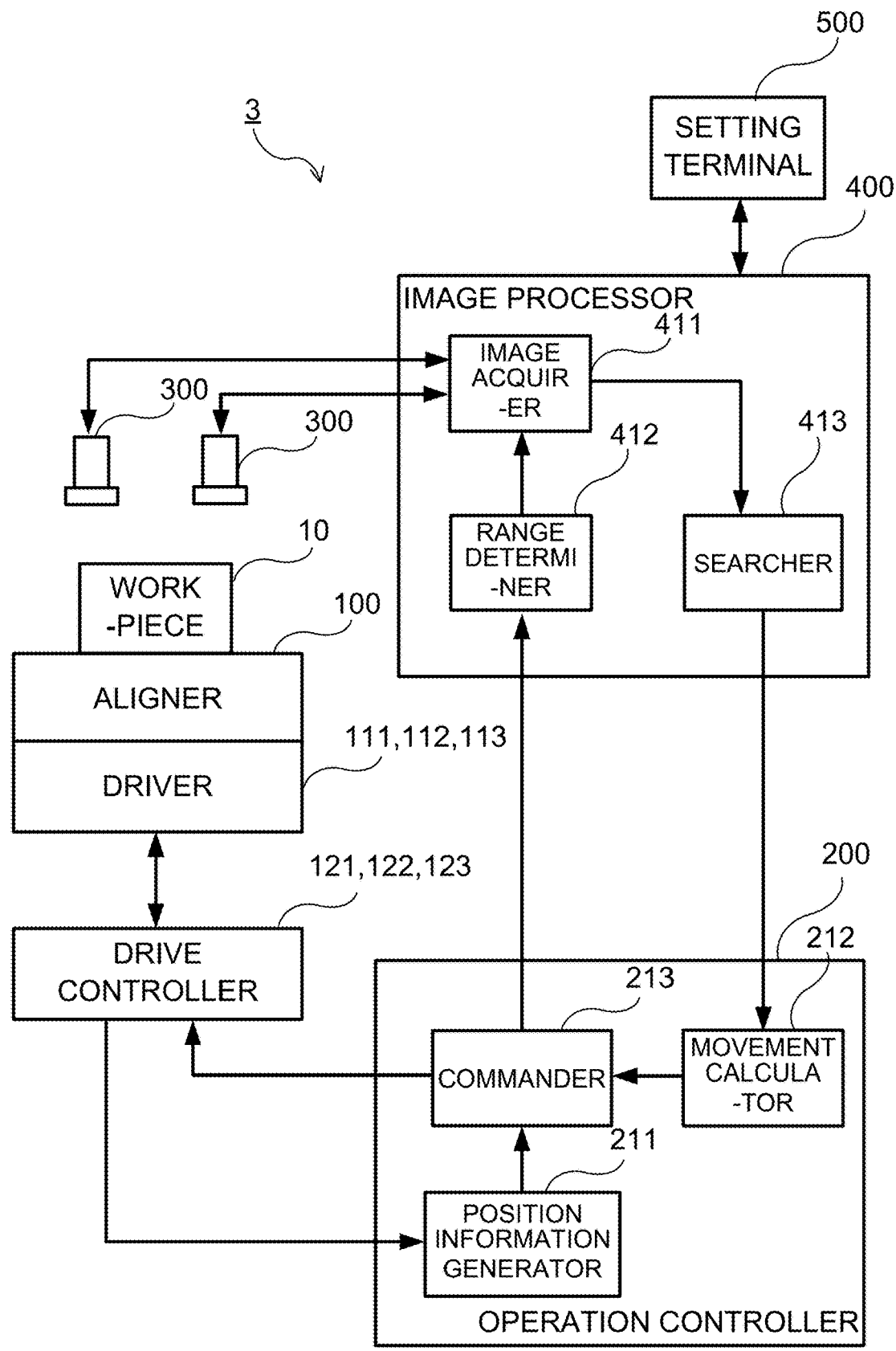
FIG. 15 is a functional block diagram of an alignment system according to Modification 1.
Figure 16:
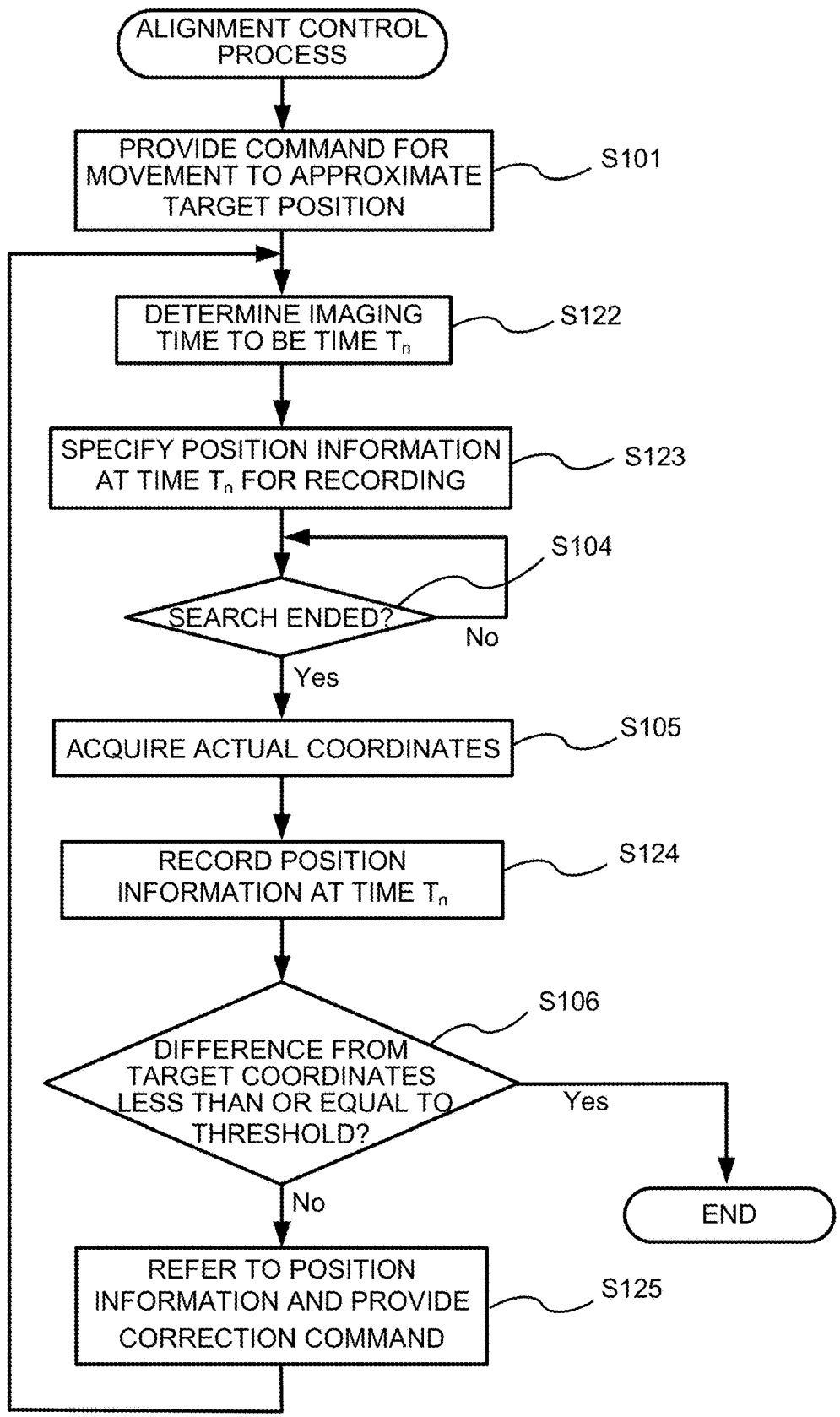
FIG. 16 is a flowchart of an alignment control process in Modification 1.
Figure 17:
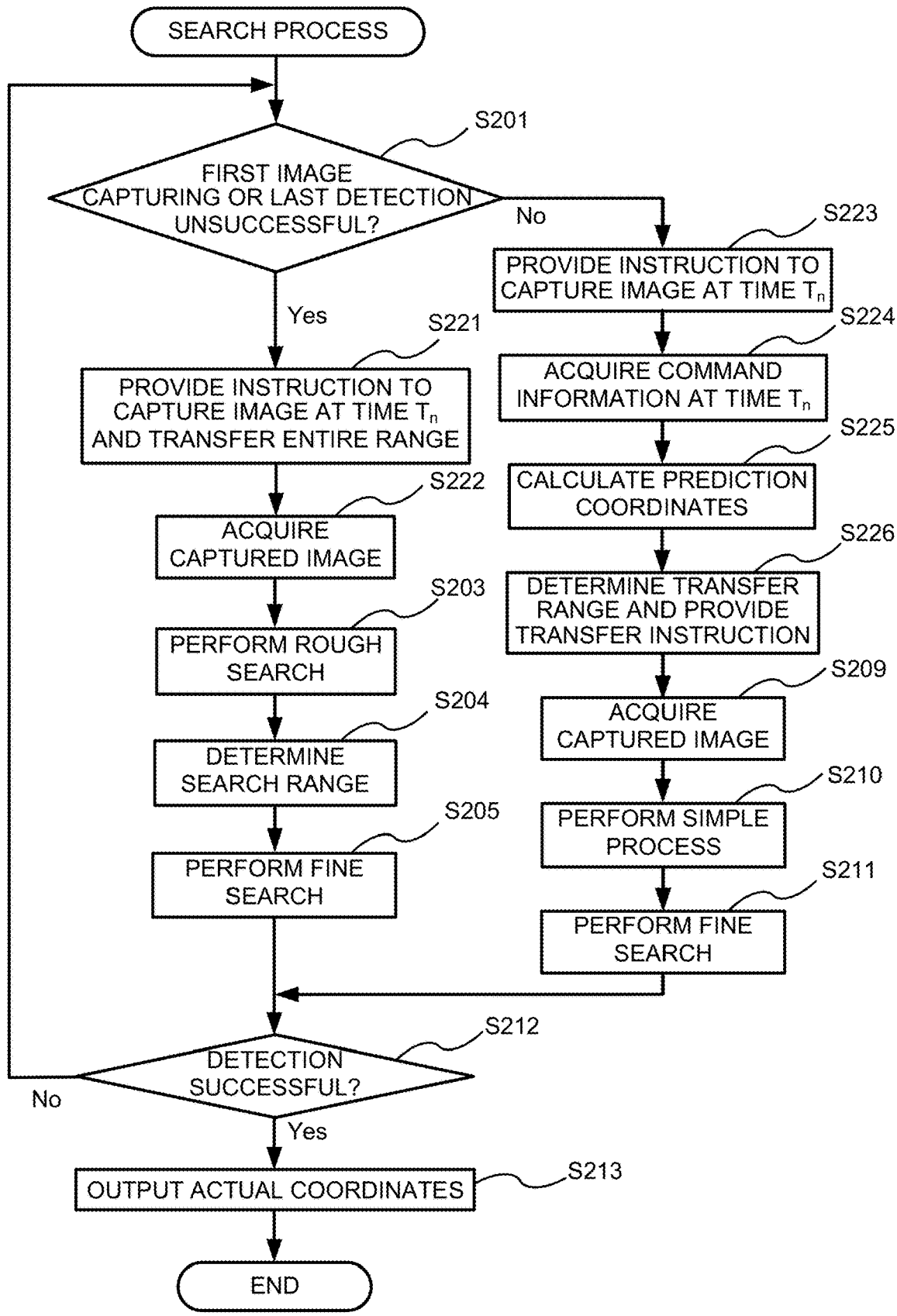
FIG. 17 is a flowchart of a search process in Modification 1.

In the present modification, image capturing of the imaging devices 300, driving of the drivers 111, 112, and 113 based on the command information, and acquisition of the outputs from the position sensors are controlled to synchronize with one another, allowing faster control. FIG. 15 is a functional block diagram of an alignment system 3 according to the present modification. FIG. 16 is a flowchart of an alignment control process performed by the operation controller 200 according to the present modification. FIG. 17 is a flowchart of a search process performed by the image processor 400.

The structure in FIGS. 15 to 17 represents a modification of Embodiment 2, and determines an image transfer range based on the command information. However, the structure can represent a modification of Embodiment 1 similarly, and determine an image search range based on the command information. The operation of the alignment system 3 according to the present modification is described below with reference to the flowcharts in FIGS. 16 and 17. The same processing as in Embodiment 2 is not described.

The operation controller 200 first provides a command to move the workpiece 10 to a preset approximate target position (step S101 in FIG. 16). The command information is passed to the image processor 400 for use in determining the transfer range. The drivers 111, 112, and 113 are then driven by the control signals for the command information to move the mount table 101 on which the workpiece 10 is placed.

After providing the movement command, the operation controller 200 determines the imaging time in the imaging devices 300 to be specific future time $T_n$(n=1) (step S122) and specifies time $T_n$ for the image processor 400. The position information generator 211 in the operation controller 200 specifies the position information at time $T_n$ for recording based on the outputs from the position sensors in the drivers 111, 112, and 113 (step S123). The operation controller 200 then waits until the image processor 400 ends the search (step S104). The subsequent operation of the image processor 400 is the same as in Embodiment 2. The image processor 400 performs steps S221, S222, S203 to S205, S212, and S213 in FIG. 17.

Referring back to the flowchart in FIG. 16, when the image processor 400 ends the search process (Yes in step S104), the movement calculator 212 in the operation controller 200 acquires the actual coordinates from the image processor 400 (step S105), and the position information generator 211 generates and records position information based on the outputs from the position sensors at time $T_n$ (step S124). The movement calculator 212 calculates the difference between the actual coordinates and the target coordinates. When the difference between the actual coordinates and the target coordinates is less than or equal to the threshold (Yes in step S106), the operation controller 200 ends the alignment control process.

When the difference between the actual coordinates and the target coordinates is greater than the threshold (No in step S106), the commander 213 provides a command to correct the position of the aligner 100. The commander 213 refers to the position information at specific time $T_n$ recorded in step S124 and provides a command to also compensate for the deviation between the position indicated by the command and the actual position indicated by the position information (step S125).

After providing the command to the aligner 100 with the commander 213, the operation controller 200 returns to step S122, determines the imaging time to be time $T_n$ (n=2) (step S122), specifies the position information at time $T_n$(n=2) for recording (step S123), and waits until the image processor 400 ends the search process (step S104).

Referring again to the flowchart in FIG. 17, when the next image capturing is for the second time or a subsequent time and the last-time detection is successful (No in step S201), the image processor 400 instructs each imaging device 300 to capture an image at time $T_n$ (n=2) (step S223). The image processor 400 acquires the command information at time $T_n$ from the operation controller 200 (step S224). The range determiner 412 in the image processor 400 calculates the prediction coordinates of the identification target at the time point (step S225).

The method for calculating the prediction coordinates with the range determiner 412 first identifies the correspondence between the command information at the first alignment control, instead of the position information as in Embodiment 2, and the actual coordinates detected in the first fine search. The range determiner 412 uses the identified correspondence to calculate the prediction coordinates (XY coordinates) of the reference point of the identification target based on the command information about the scheduled position at specific time $T_n$ acquired in step S224 (step S225). The method for predicting coordinates using the correspondence is the same as in Embodiment 2.

The range determiner 412 then determines a transfer range having a predetermined size centered at the XY coordinates predicted in step S225, and instructs each imaging device 300 to transfer the portion of the image within the determined transfer range (Step S226). The transfer range may be other than the range centered at the predicted XY coordinates, and may be a range including the predicted XY coordinates as appropriate for the alignment conditions or the shape of the identification target.

The image acquirer 411 acquires the portion of the image within the transfer range transferred as indicated by the transfer instruction in step S226 (step S209), and performs a simple process (step S210). The searcher 413 then performs a fine search on the portion of the image within the transfer range acquired in step S209 or on the image subjected to the simple process in step S210 (step S211). When no identification target is detected in the fine search in step S211 (No in step S212), the process returns to step S201 and performs steps S221, S222, and S203 to 205, with the last-time detection being unsuccessful (Yes in step S201).

When the identification target is successfully detected in the fine search in step S211 (Yes in step S212), the actual coordinates of the identification target acquired in step S211 are output to the operation controller 200 (step S213). The subsequent processing performed by the operation controller 200 is the same as in Embodiment 2.

As described above, the range determiner 412 in the image processor 400 determines the transfer range of the image based on the command information from the operation controller 200. The searcher 413 performs a fine search on the image transferred from each imaging device 300. This allows more efficient timing control and faster alignment control, with the search range or the transfer range determined based on the command information about the future scheduled position.

Modification 2

In Modification 2, another method for determining a search range or a transfer range is described. In Embodiments 1 and 2, the range determiner 412 determines a search range or a transfer range centered at the prediction coordinates calculated based on the position information. In the present modification, the search range or the transfer range is determined using last detected actual coordinates as the center.

More specifically, the range determiner 412 determines, as the transfer range, a range centered at the reference point of the identification target that is last detected by the searcher 413 in the image processor 400 in the fine search and stored in the nonvolatile memory 230, without acquiring position information or command information. In another example, the range determiner 412 determines, as the search range, a range centered at the reference point of the stored identification target or the angular range centered at the rotation angle of the identification target. The transfer range or the search range may be other than the range centered at the last detected actual coordinates, and may be a range including the last detected actual coordinates as appropriate for the alignment conditions or the shape of the identification target.

The size of the search range or the transfer range may be determined based on the movement speed of the actual coordinates of the identification target detected in the past. In another example, the size of the search range or the transfer range may be determined based on the movement speed of each driver based on setting parameters in the alignment control. For example, the size may be determined by multiplying the maximum movement speed by the imaging interval of the imaging devices 300. When the movement distance between the imaging intervals is short with short imaging intervals being set, the last detection result may be used to sufficiently limit the search range or the transfer range. The structure in this modification can thus simplify the processing compared with the structures in Embodiments 1 and 2 and Modification 1.

Modification 3

In Modification 3, another method for determining a search range or a transfer range is described. In the present modification, the range determiner 412 determines the search range or the transfer range based on the trajectory of the actual coordinates detected in the past fine searches performed by the searcher 413. In other words, the structure calculates, without acquiring position information or command information as in Embodiments 1 and 2, the prediction coordinates based on the trajectory of the actual coordinates of the identification target detected in the past fine searches performed by the searcher 413 in the image processor 400 and stored in the nonvolatile memory 230, and determines a range centered at the prediction coordinates as the search range or the transfer range.

Figure 18A:
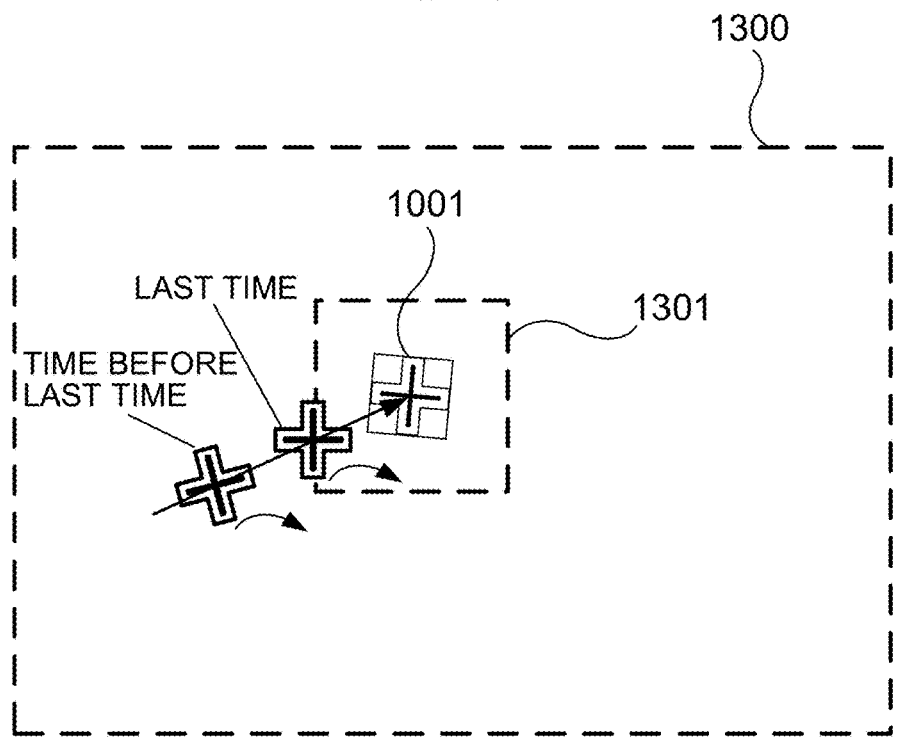
FIG. 18A is a diagram illustrating prediction of an identification target in Modification 3.
Figure 18B:
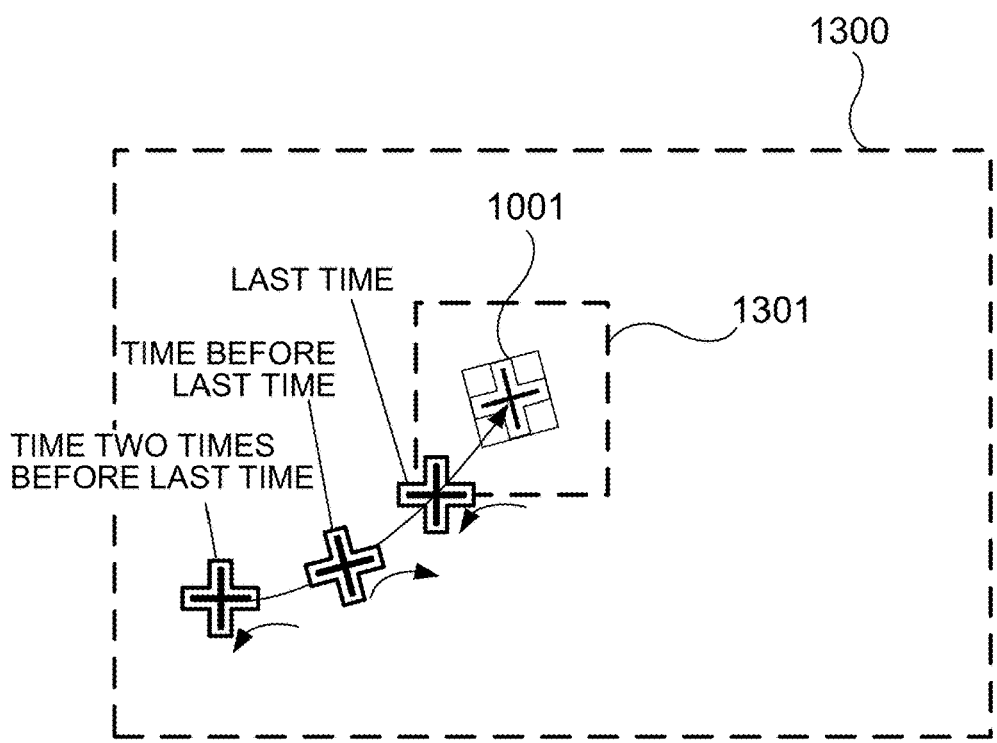
FIG. 18B is a diagram illustrating prediction of an identification target in Modification 3.

More specifically, the range determiner 412 determines, as the transfer range, a range having a predetermined size centered at the XY coordinates predicted based on the trajectory of the XY coordinates of the reference point of the identification target. In another example, the range determiner 412 determines, as the search range, a range having a predetermined size centered at the XY coordinates predicted based on the trajectory of the XY coordinates of the reference point of the identification target or an angular range centered at the θ coordinate predicted based on the trajectory of the θ coordinate. FIGS. 18A and 18B are diagrams illustrating the prediction of the identification target. The transfer range or the search range may be other than the range centered at the predicted coordinates, and may be a range including the predicted coordinates as appropriate for the alignment conditions or the shape of the identification target.

The prediction coordinates (XYθ coordinates) are calculated based on the prediction at image capturing by the imaging devices 300, using two or more preceding times and the actual coordinates at each of the two or more preceding times. For example, as illustrated in FIG. 18A, the XY coordinates at image capturing are predicted by linear prediction based on data indicating the XY coordinates at last two times, or more specifically, the last time and the time before the last time. In another example, as illustrated in FIG. 18B, the XY coordinates at image capturing are predicted by second order prediction based on data indicating the XY coordinates at last three times, or more specifically, the last time, the time before the last time, and the time two times before the last time.

The size of the search range or the transfer range may be determined based on the movement speed of the actual coordinates of the identification target detected in the past. In another example, the size may be determined based on the movement speeds of the drivers 111, 112, and 113. For example, the size may be determined by multiplying the maximum movement speed by the imaging interval of the imaging devices 300. Linear prediction has lower prediction accuracy than second order or higher order prediction, and thus involves a larger search range size or transfer range size.

The size of the search range or the transfer range may be determined based on statistical information about errors from the past detection results. For example, the size may be acquired by adding, as a margin, to the shape and size of the identification target, the average difference between the prediction coordinates based on the trajectory of the actual coordinates and the actual coordinates detected from the captured image at past time points corresponding to each other.

When the imaging interval is longer and the travel distance between the imaging intervals is longer, the structure in the present modification can have higher prediction accuracy and can have a smaller search range or transfer range.

Modification 4

Figure 19A:
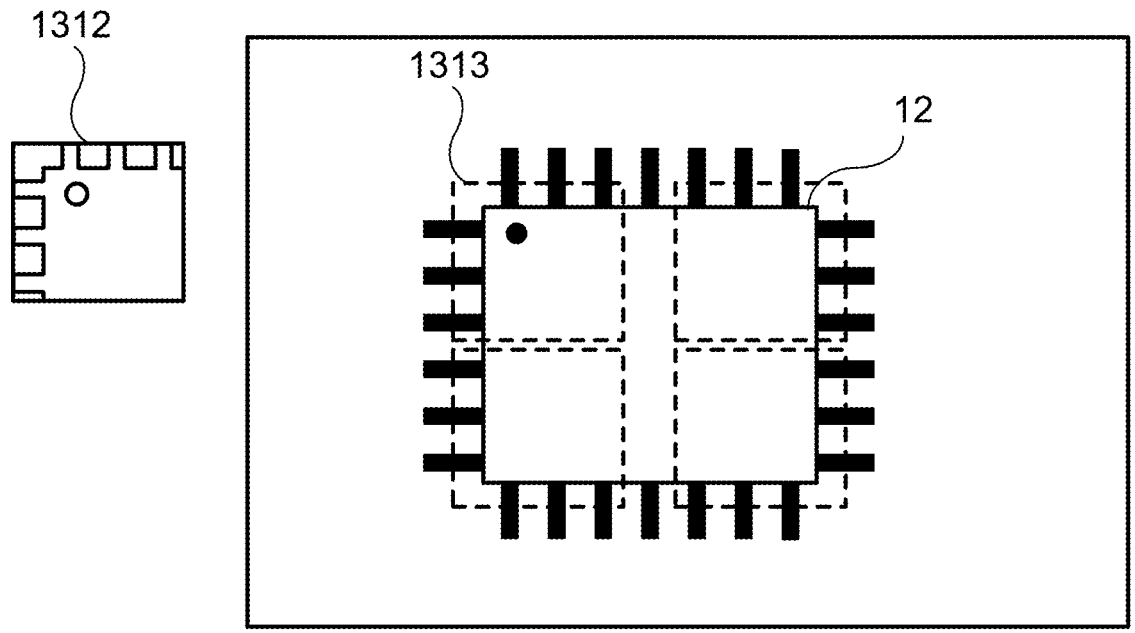
FIG. 19A is a diagram illustrating a rough search in Modification 4.
Figure 19B:
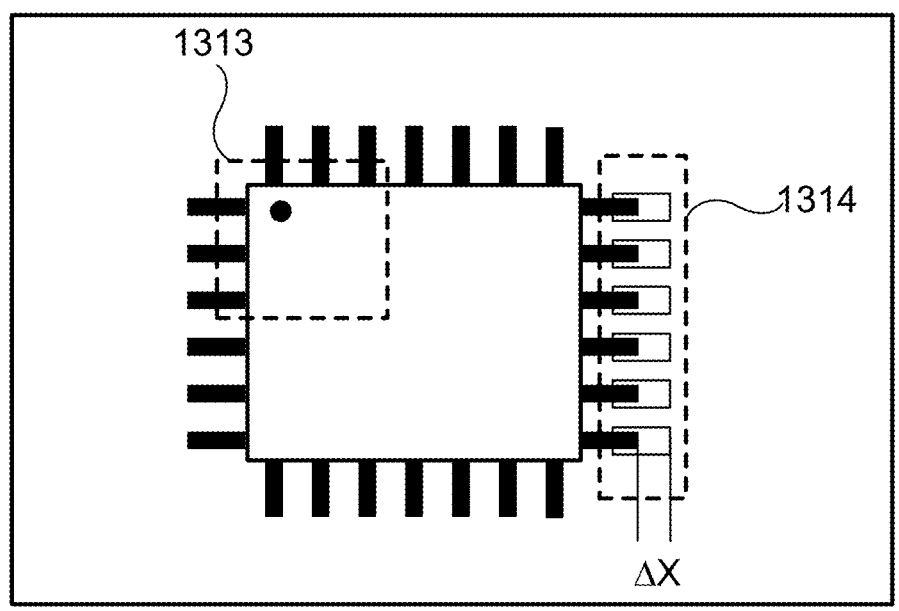
FIG. 19B is a diagram illustrating a fine search in Modification 4.

In Embodiments 1 and 2 described above, the identification target includes the alignment marks 1001 and 1002 on the workpiece 10, but the processing may be partially changed as appropriate for the shape of the identification target. FIG. 19A is a diagram illustrating a rough search in the present modification. FIG. 19B is a diagram illustrating a fine search in the present modification.

For example, for a workpiece 12 that is an integrated circuit (IC) having many terminals as identification targets as illustrated in FIG. 19A, the searcher 413 performs a rough search by pattern matching using a pattern model 1312 (step S203 in FIG. 8).

In the search, the searcher 413 determines a search range 1314 for a fine search based on the position or the rotation angle of a pattern 1313 when the pattern matching rate is greater than or equal to a predetermined threshold (step S204 in FIG. 8). In this pattern matching, as illustrated in FIG. 19A, multiple patterns having the matching rate greater than or equal to a predetermined threshold may be detected. In this case, a pattern 1313 having the highest matching rate may be identified to determine the search range 1314.

In the example illustrated in FIG. 19B, the searcher 413 determines, as the search range for the fine search, the search range 1314 having a predetermined positional relationship with respect to the pattern 1313 identified by the rough search (step S204 in FIG. 8). The searcher 413 performs a fine search on the search range determined in step S204 (step S205 in FIG. 8).

In Embodiments 1 and 2, when the image capturing is for the second time or a subsequent time and the last-time detection is successful (No in step S201 in FIG. 8), the search range including the prediction coordinates calculated based on the position information is determined (step S208 in FIG. 8), and the fine search is performed (step S211 in FIG. 8). However, when the prediction coordinates can be calculated with a predetermined accuracy, as with the IC illustrated in FIG. 19A, the fine search may be repeated using the search range determined in the rough search in step S203, without calculating the prediction coordinates based on the position information. When the detection by the fine search is unsuccessful, the search range for a rough search may be determined.

The structure according to the present modification can simplify the process as appropriate for the shape of the identification target. An application in the setting terminal 500 may classify the shape of the identification target and automatically select a search method for the classification.

Modification 5

Figure 20A:
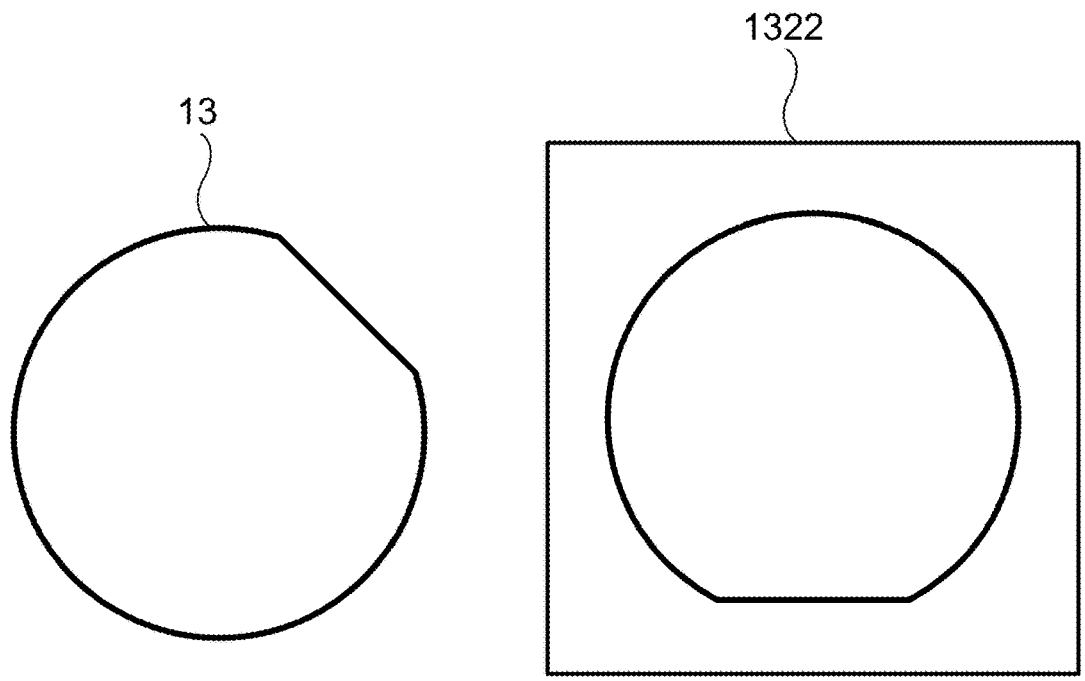
FIG. 20A is a diagram illustrating a rough search in Modification 5.
Figure 20B:
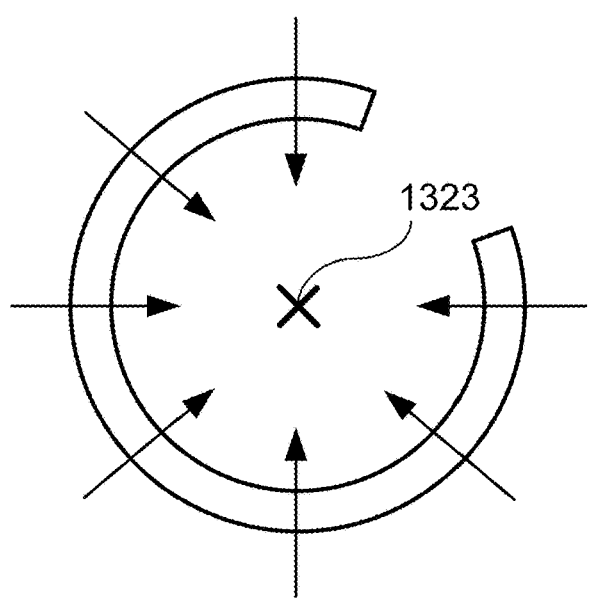
FIG. 20B is a diagram illustrating a fine search in Modification 5.

In Modification 5 described below, the identification target is in another different shape. FIG. 20A is a diagram illustrating a rough search in the present modification. FIG. 20B is a diagram illustrating a fine search in the present modification. In the present modification, a processor in the setting terminal 500 executes a dedicated application program to automatically register a rough search model and generate logic of a fine search.

For example, for a workpiece 13 that is a lens as illustrated in FIG. 20A, the processor in the setting terminal 500 extracts a lens outline from a captured image and registers a pattern model 1322. The processor then automatically generates search logic for a fine search based on the shape of the pattern model 1322. For example, as illustrated in FIG. 20B, when the processor in the setting terminal 500 detects the shape of the pattern model 1322 including an arc, the processor automatically generates, as logic for the fine search, logic including searching for an edge, approximating the detected edge to a circle, and detecting the center of the circle as a reference point 1323.

The image processor 400 performs the search process described in Embodiments 1 and 2 using the pattern model for the rough search and the logic for the fine search generated by the application in the setting terminal 500. The structure according to the present modification can perform an optimum rough search and an optimum fine search as appropriate for the shape of the identification target. The structure also allows automatic pre-setting for the search process with the image processor 400 and thus reduces the burden on a user to input settings into the setting terminal 500.

Modification 6

In Embodiments 1 and 2, the rough search is performed on the image captured for the first time, the fine search is performed on the search range determined based on the result of the rough search, and the prediction coordinates of the identification target are calculated based on the result of the fine search to determine the search range or the transfer range for the next fine search. However, when the prediction accuracy of the coordinates of the identification target is sufficiently high, the rough search on the first captured image may be eliminated by performing calibration before alignment control. Such pre-calibration is particularly effective for alignment control using a corner of the mount table 101 on which the workpiece 10 is placed, with an error per execution being small.

Figure 21:
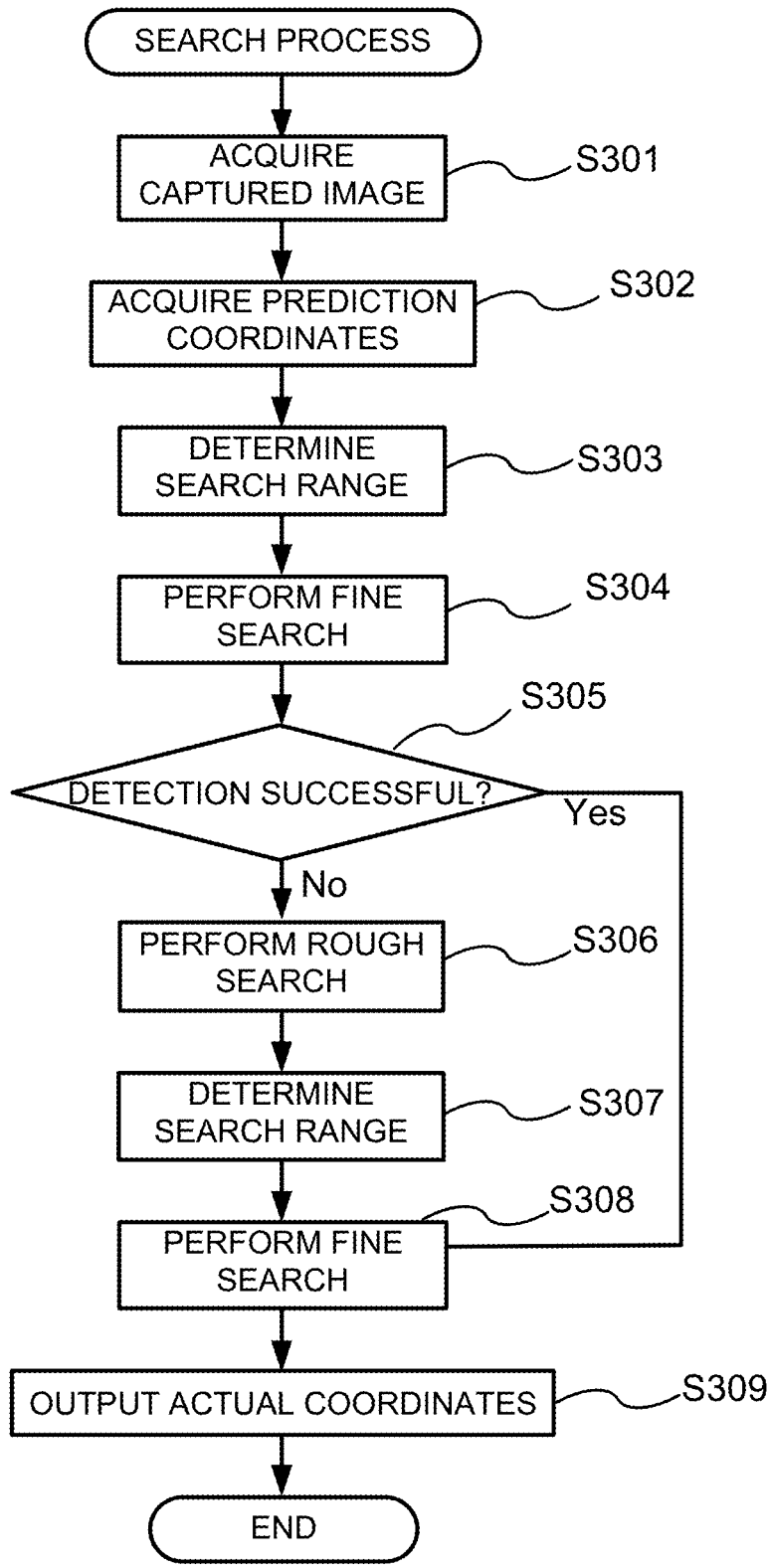
FIG. 21 is a flowchart of a search process in Modification 6.

FIG. 21 is a flowchart of a search process without the rough search for the first captured image. After the image acquirer 411 acquires a captured image for the first time (step S301), the range determiner 412 calculates the prediction coordinates of the identification target based on position information using pre-calibration information (step S302). The search range including the prediction coordinates calculated by the range determiner 412 is determined (step S303), and a fine search is performed on the determined search range (step S304).

When the actual coordinates of the identification target are successfully detected in the fine search in step S304 (Yes in step S305), the actual coordinates are output to the operation controller 200 (step S309), and the operation controller 200 controls the drivers 111, 112, and 113 using the actual coordinates. After the workpiece 10 moves, a fine search is performed on the same search range as the last time for the next captured image. Thus, when the actual coordinates are successfully detected in the fine search, the fine search is repeated without a rough search.

In repeating the fine search, when detection of the identification target is unsuccessful (No in step S305), a rough search is performed (step S306) to determine a search range (step S307). The fine search is performed on the determined search range (step S308), and the actual coordinates are output (step S309). In the present modification described above, the fine search is repeated based on the pre-calibration information, and the rough search is performed when the identification target cannot be detected. This simplifies processing and allows fast alignment control.

The hardware configuration and the flowcharts illustrated in the above embodiments and the modifications are mere examples, and can be changed or modified as appropriate. For example, in the above embodiments and modifications, the operation controller 200, the imaging devices 300, the image processor 400, and the setting terminal 500 are independent components, but at least two of the components may be integral with each other.

The search processes illustrated in the above embodiments and modifications may be combined as appropriate. The setting terminal 500 may be used to select any one of the search processes in the above embodiments and the modifications. In another example, the image processor 400 may automatically select any one of the search processes in the above embodiments and the modifications as appropriate for conditions such as workpiece types and the shapes of the identification targets.

In the above embodiments and the modifications, the functions implemented by the processors in the operation controller 200 and in the image processor 400 are shared in an example manner, and may be shared in a different manner as appropriate. The functions implemented by the processors in the operation controller 200 and in the image processor 400 may be implemented with a general computer system, rather than a dedicated system.

A program for performing the operations described in the above embodiments may be stored in a non-transitory computer-readable recording medium such as a compact disc read-only memory (CD-ROM), a digital versatile disc (DVD), a magneto-optical (MO) disk, or a memory card for distribution, and may be installed on a computer to implement the above functions. In the system with the functions implementable by the operating system (OS) and an application in a shared manner or through cooperation between the OS and the application, portions executable by the application other than the OS may be stored in a non-transitory recording medium.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST 1, 2, 3 Alignment system
10, 12, 13 Workpiece
11 Alignment target
40 Master station
50, 60, 70 Device station
100 Aligner
101 Mount table
111, 112, 113 Driver
121, 122, 123 Drive controller
200 Operation controller
210 Processor
211 Position information generator
212 Movement calculator
213 Commander
220 Volatile memory
230 Nonvolatile memory
231 Control program
232 Control data
240 Clock
250 Communication interface
300 Imaging device
400 Image processor
410 Processor
411 Image acquirer
412 Range determiner
413 Searcher
420 Volatile memory
430 Nonvolatile memory
431 Control program
432 Control data
440 Clock
450 Communication interface
500 Setting terminal
1001, 1002 Alignment mark
1101, 1102 Alignment target mark
1200 θ-axis rotation center
1201 Imaginary mark
1300 Imaging range
1301, 1314 Search range
1312, 1322 Pattern model
1313 Pattern
1323 Reference point

The invention claimed is:

1. An alignment system, comprising:
an image processor to detect an identification target included in a workpiece from a captured image of the workpiece; and
an operation controller to control a driver to move the workpiece based on actual coordinates in a reference coordinate system that indicate a position of the identification target detected by the image processor in the captured image,
wherein the image processor
pre-identifies a constant matrix representing a correspondence between coordinates indicating position information acquired from a position sensor in the driver and the actual coordinates of the identification target,
determines within the captured image a search range partially covering the captured image, having a predetermined size, and including prediction coordinates that are calculated based on the position information using the constant matrix and that are predicted values of the actual coordinates, and
detects the identification target from a portion of the captured image corresponding to the search range.

2. The alignment system according to claim 1, wherein
the driver is a servomotor to move a mount table on which the workpiece is placed, and
the position information corresponds to a position of the mount table and is generated based on an output from an encoder attached to the servomotor.

3. The alignment system according to claim 1, wherein
the search range has a size acquired by adding a margin determined based on a movement speed of the driver to a shape or a size of the identification target.

4. The alignment system according to claim 1, wherein
the search range has a size acquired by adding, to a shape or a size of the identification target, a margin determined based on a difference between the prediction coordinates calculated based on the position information and the actual coordinates detected from the captured image at past time points corresponding to each other.

5. The alignment system according to claim 1, wherein
the actual coordinates include a rotation angle of the identification target, and
the image processor identifies the rotation angle of the identification target by searching a portion of the captured image within a search angular range having a predetermined angular width and including the prediction coordinates calculated based on the position information.

6. The alignment system according to claim 1, wherein
the image processor performs a rough search on a full range of the captured image when the identification target is not detected through a fine search performed on the portion of captured image corresponding to the search range determined based on the position information.

7. An alignment method, comprising:
searching a captured image of a workpiece including an identification target to detect the identification target; and
providing a command to a driver to move the workpiece based on actual coordinates in a reference coordinate system that indicate a position of the detected identification target in the captured image,
wherein searching the captured image includes
pre-identifying a constant matrix representing a correspondence between coordinates indicating position information acquired from a position sensor in the driver and the actual coordinates of the identification target, and detecting the identification target from a portion of the captured image corresponding to a search range within the captured image, the search range partially covering the captured image, having a predetermined size, and including prediction coordinates that are calculated based on the position information using the constant matrix and that are predicted values of the actual coordinates.

8. A non-transitory computer-readable recording medium storing a program executable by a computer in an alignment system to detect an identification target included in a workpiece from a captured image of the workpiece and to perform alignment control of the workpiece based on actual coordinates in a reference coordinate system that indicate a position of the detected identification target in the captured image, the computer being configured to perform image processing on the captured image, the program causing the computer to function as:

a searcher to
pre-identify a constant matrix representing a correspondence between coordinates indicating position information acquired from a position sensor in a driver performing the alignment control and the actual coordinates of the identification target,
determine within the captured image a search range partially covering the captured image, having a predetermined size, and including prediction coordinates that are calculated based on the position information using the constant matrix and that are predicted values of the actual coordinates, and
detect the identification target from a portion of the capture image corresponding to the determined search range.

9. The alignment system according to claim 2, wherein
the image processor performs a rough search on a full range of the captured image when the identification target is not detected through a fine search performed on the portion of captured image corresponding to the search range determined based on the position information.

10. The alignment system according to claim 3, wherein
the image processor performs a rough search on a full range of the captured image when the identification target is not detected through a fine search performed on the portion of captured image corresponding to the search range determined based on the position information.

11. The alignment system according to claim 4, wherein
the image processor performs a rough search on a full range of the captured image when the identification target is not detected through a fine search performed on the portion of captured image corresponding to the search range determined based on the position information.

12. The alignment system according to claim 5, wherein
the image processor performs a rough search on a full range of the captured image when the identification target is not detected through a fine search performed on the portion of captured image corresponding to the search range determined based on the position information.

* * * * *